United States Patent
Cahill et al.

(10) Patent No.: US 7,676,977 B1
(45) Date of Patent: Mar. 16, 2010

(54) BIPOD

(75) Inventors: Jeffrey M. Cahill, Claremont, CA (US); Timothy J. Bowman, San Jose, CA (US)

(73) Assignee: Tango Down, Inc., Tucson, AZ (US)

( * ) Notice: Subject to any disclaimer, the term of this patent is extended or adjusted under 35 U.S.C. 154(b) by 389 days.

(21) Appl. No.: 11/633,867

(22) Filed: Dec. 4, 2006
(Under 37 CFR 1.47)

Related U.S. Application Data

(60) Provisional application No. 60/742,243, filed on Dec. 4, 2005.

(51) Int. Cl.
*F41C 27/22* (2006.01)
*F41A 23/10* (2006.01)
*F16M 11/06* (2006.01)

(52) U.S. Cl. ........................... 42/94; 89/37.04; 248/168
(58) Field of Classification Search .............. 42/90, 42/94; 89/37.04, 37.05; 248/168
See application file for complete search history.

(56) References Cited

U.S. PATENT DOCUMENTS

| 2,807,904 A * | 10/1957 | Kreske ............................ 42/94 |
| 2,919,093 A * | 12/1959 | Mooney ..................... 248/168 |
| 3,745,879 A * | 7/1973 | Asikainen et al. .......... 89/37.05 |
| 4,580,483 A * | 4/1986 | Garbini ...................... 89/40.06 |
| 4,625,620 A | 12/1986 | Harris |
| 4,903,425 A | 2/1990 | Harris |
| 5,074,188 A | 12/1991 | Harris |
| 5,410,835 A | 5/1995 | Vetter |
| 5,711,103 A * | 1/1998 | Keng .............................. 42/94 |
| 6,487,807 B1 | 12/2002 | Kopman et al. |
| 6,763,627 B1 | 7/2004 | Kaempe |
| 6,829,857 B1 | 12/2004 | Houtsma |
| 6,843,015 B2 | 1/2005 | Sharp |
| 7,111,424 B1 | 9/2006 | Moody et al. |
| 7,426,800 B2 * | 9/2008 | Pierce et al. .................... 42/94 |
| 2005/0241206 A1 | 11/2005 | Teetzel et al. |
| 2006/0248774 A1 * | 11/2006 | Pierce et al. .................. 42/94 |
| 2006/0277809 A1 | 12/2006 | Moody et al. |

OTHER PUBLICATIONS

Atlantic Research Marketing Systems, Inc. "A.R.M.S., Inc."; New products; http://www.armsmounts.com/new.html; 10pp.
GG&G—Fully Adjustable Tactical Bipod; http://www.gggaz.com/products/bipod.php; 4pp.
Harris Bipods; http://www.harrisbipods.com; 5pp.
TDI Tactical Bipods; http://www.botac.com/botach/tditabi.html; 2pp.
Versa-Pod: Military: Our Products: Prone Position Bipods; http://versapod.com/m_h/military/military_products_pr.html; 6pp.

* cited by examiner

*Primary Examiner*—Bret Hayes
(74) *Attorney, Agent, or Firm*—Christie, Parker & Hale, LLP

(57) ABSTRACT

A bipod for a firearm is provided, including a body with cutouts to receive a bipod base, and a pair of legs. The bipod base is pivotally mounted to the body, and a firearm mounting bracket is pivotally mounted to the bipod base, allowing for a traversing and/or canting motion. A ball lock mounts each leg to the body, allowing the legs to be independently deployed or stored with the push of a plunger. The legs also telescope to allow adjustment of the bipod height.

25 Claims, 22 Drawing Sheets

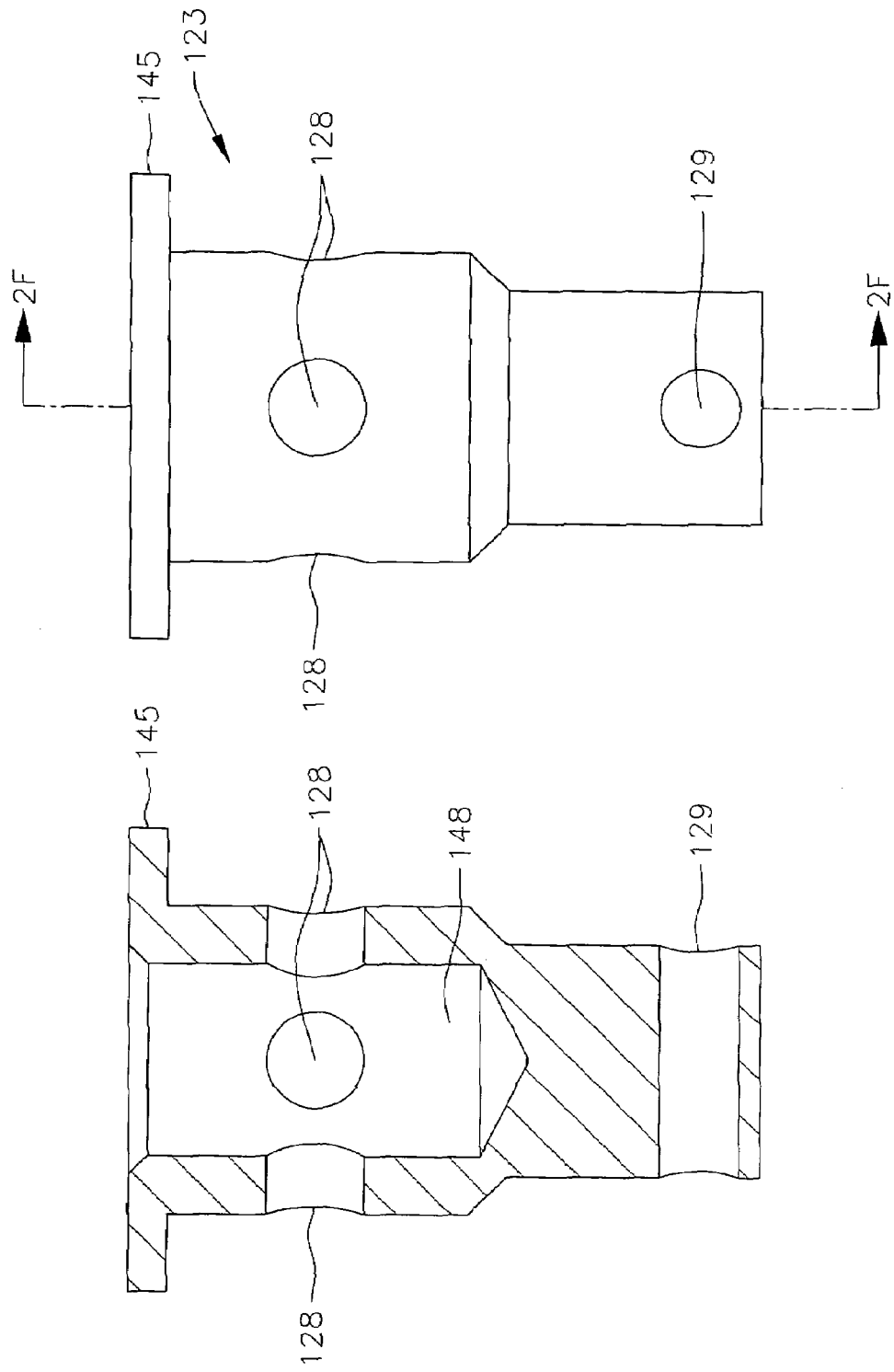

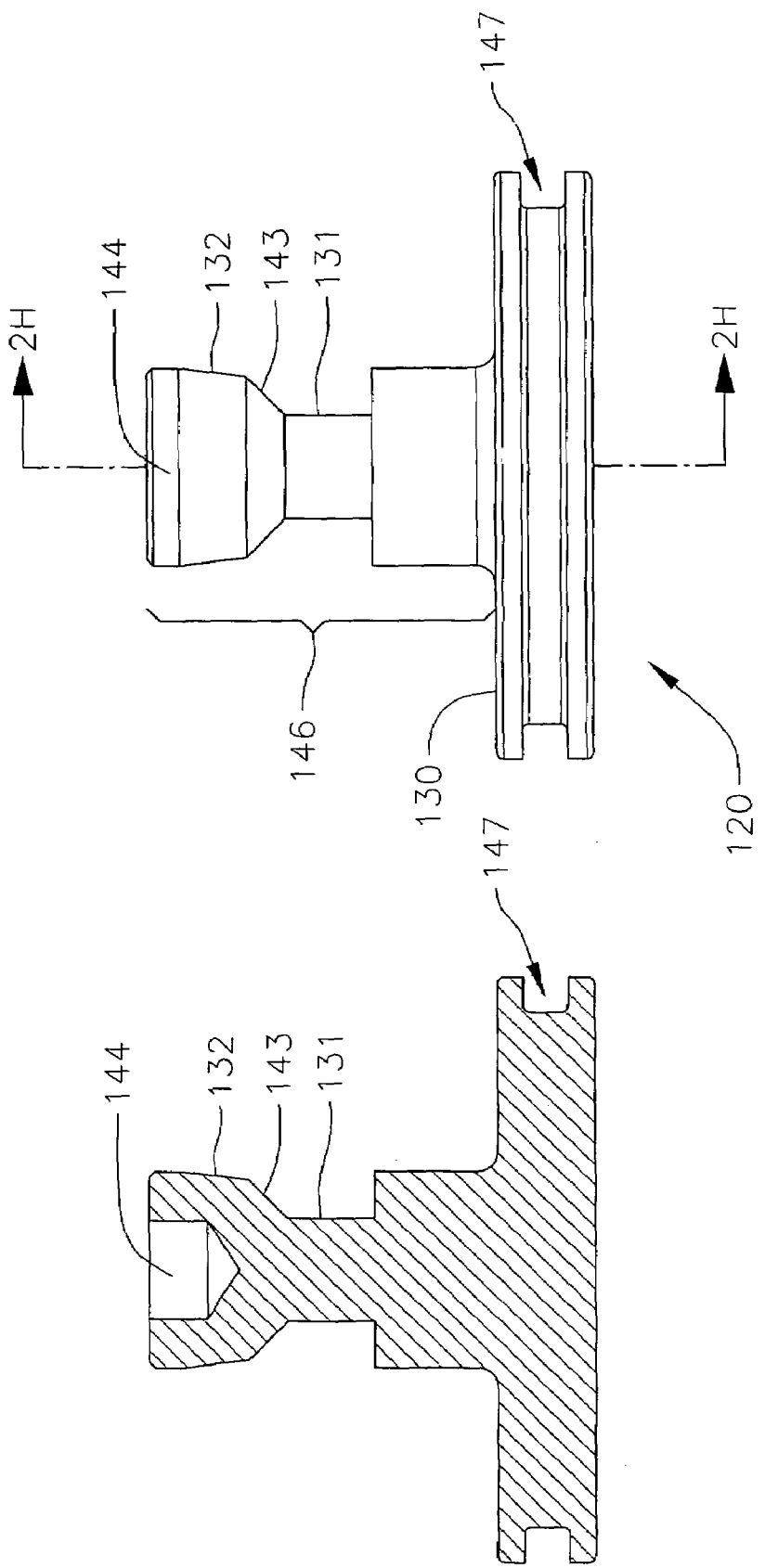

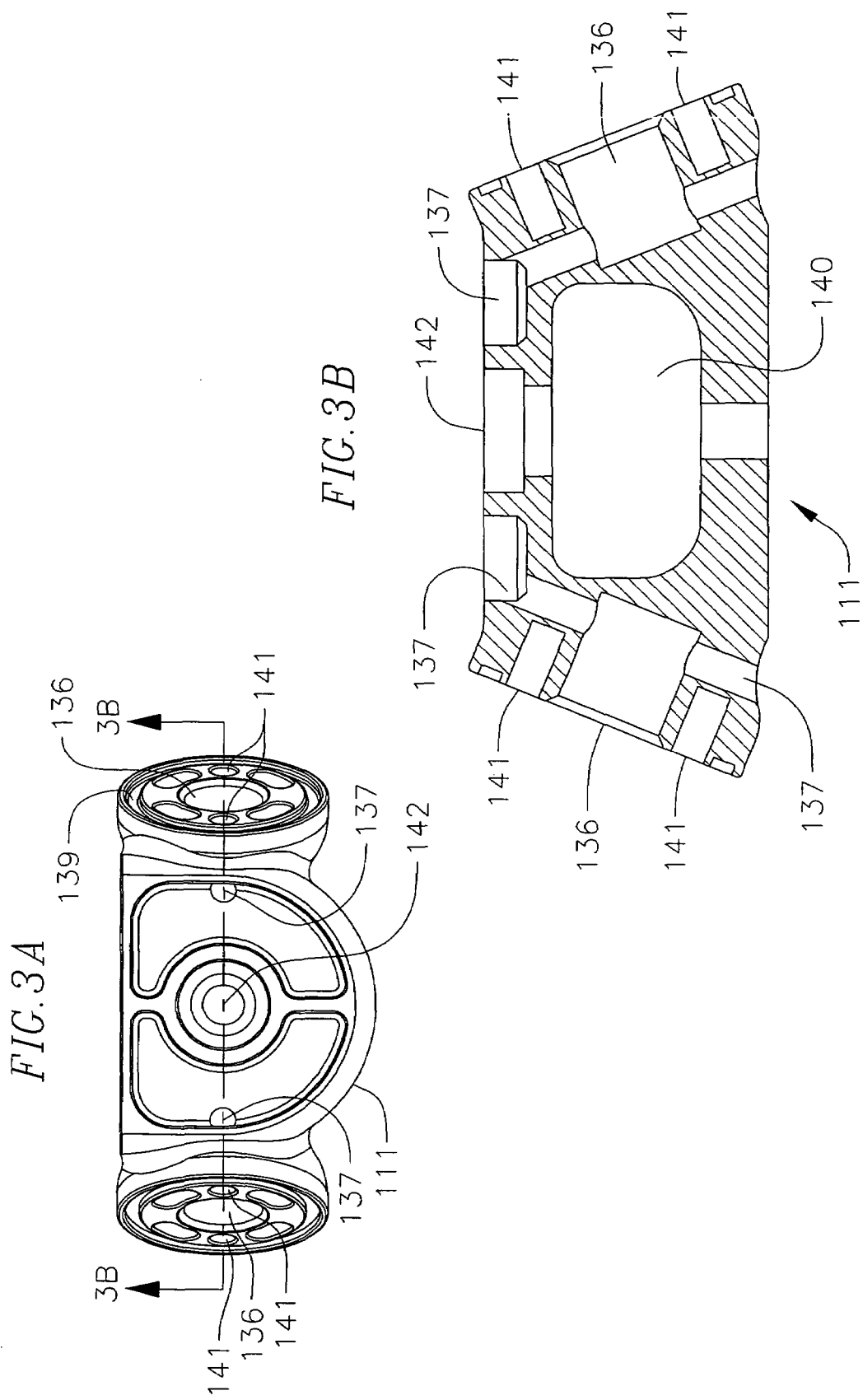

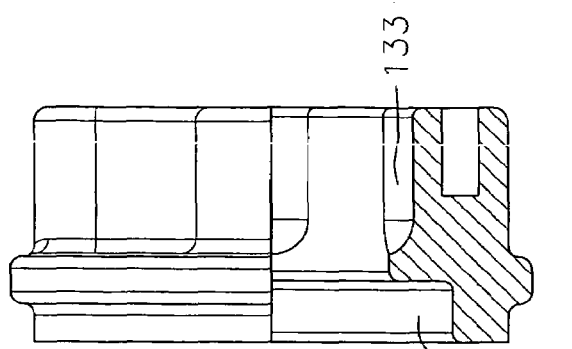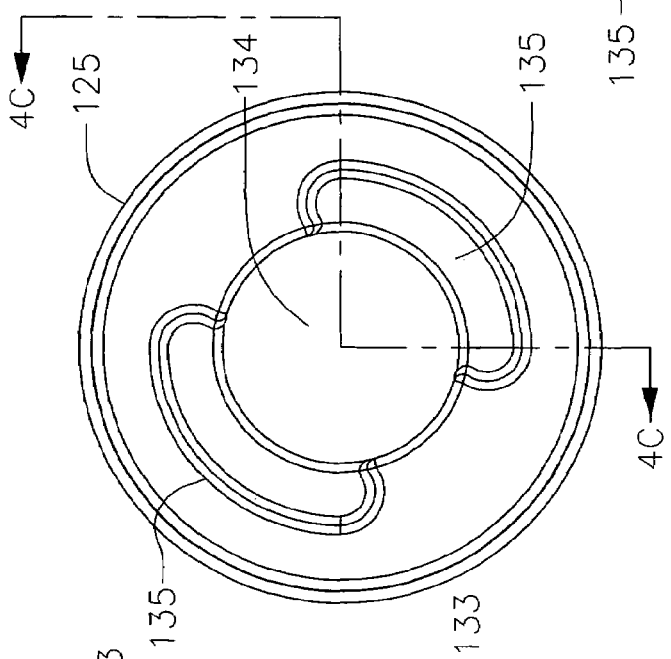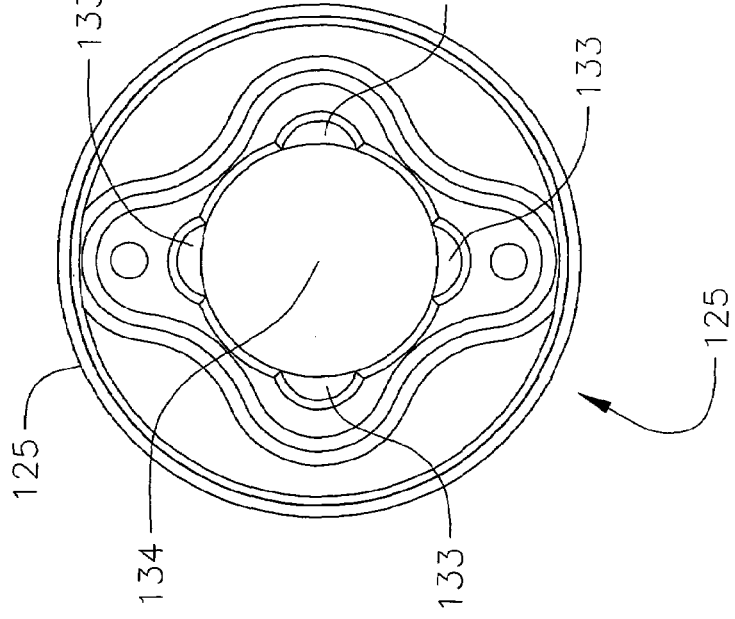

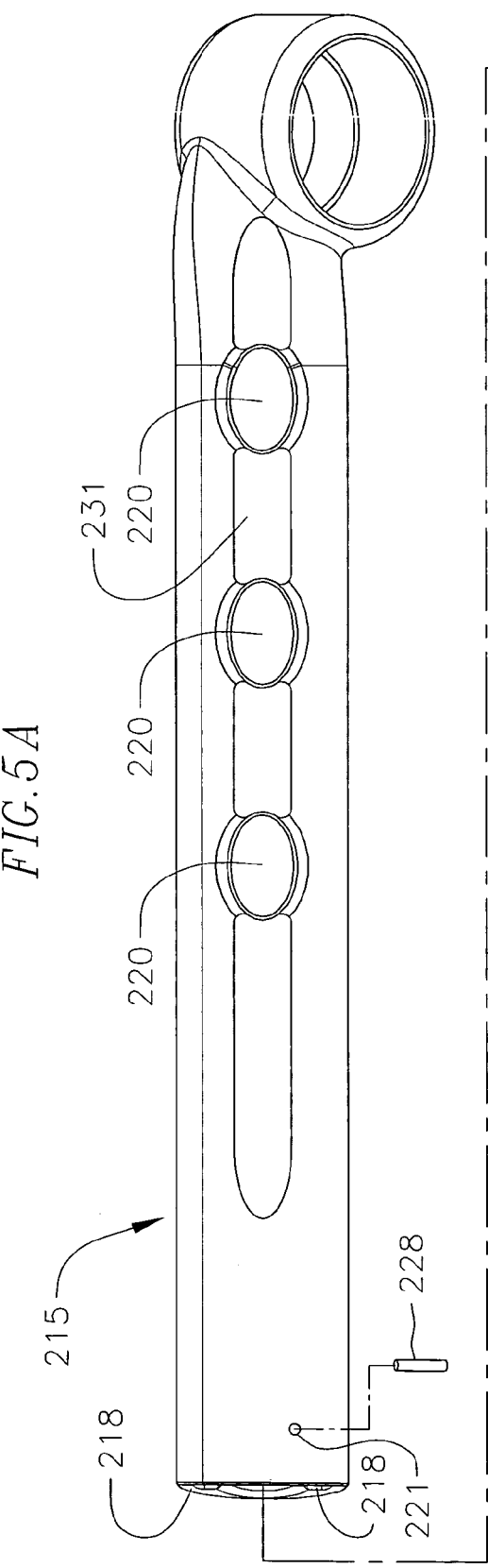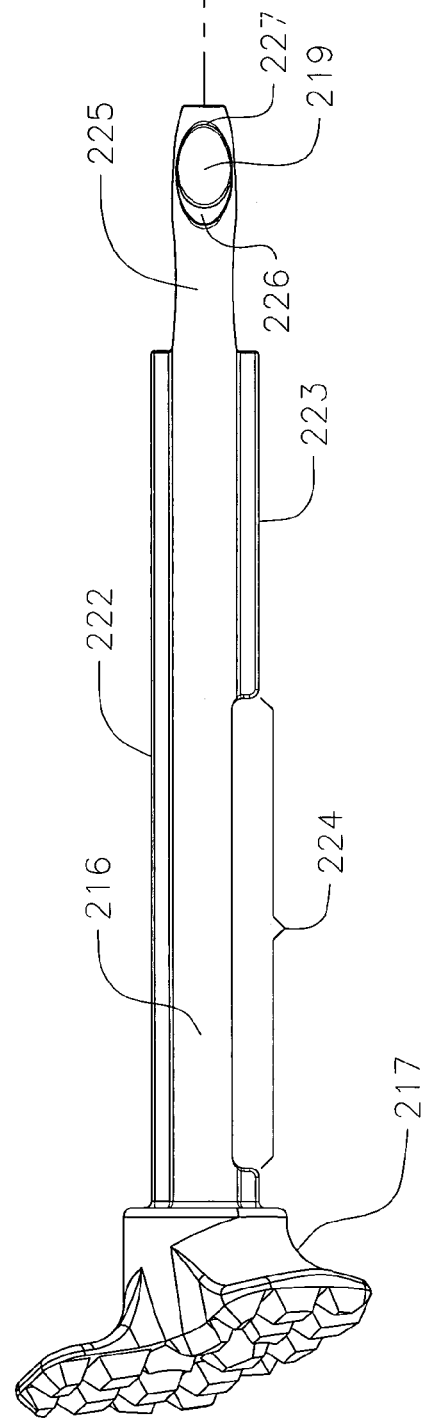
FIG.5A

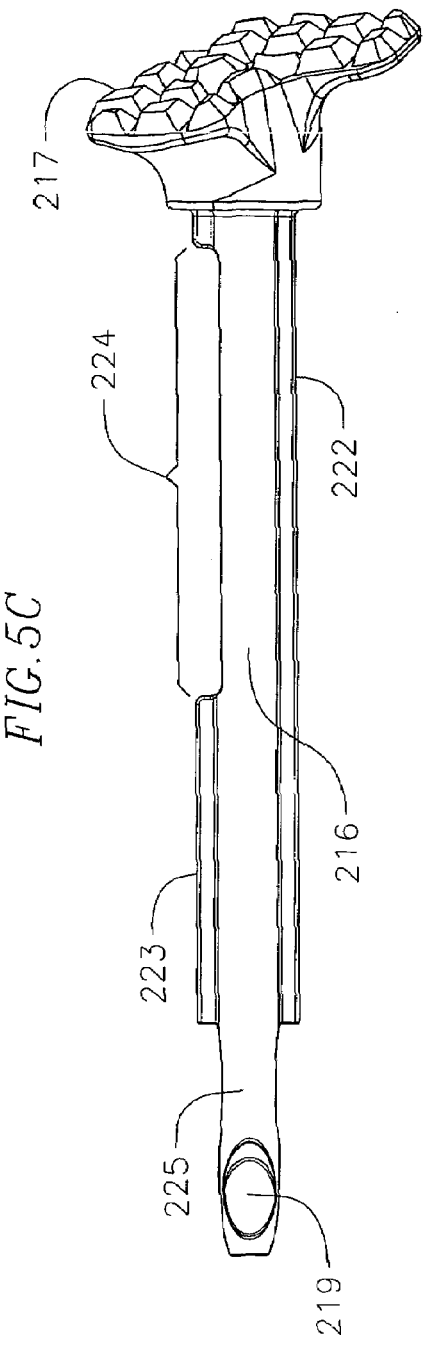
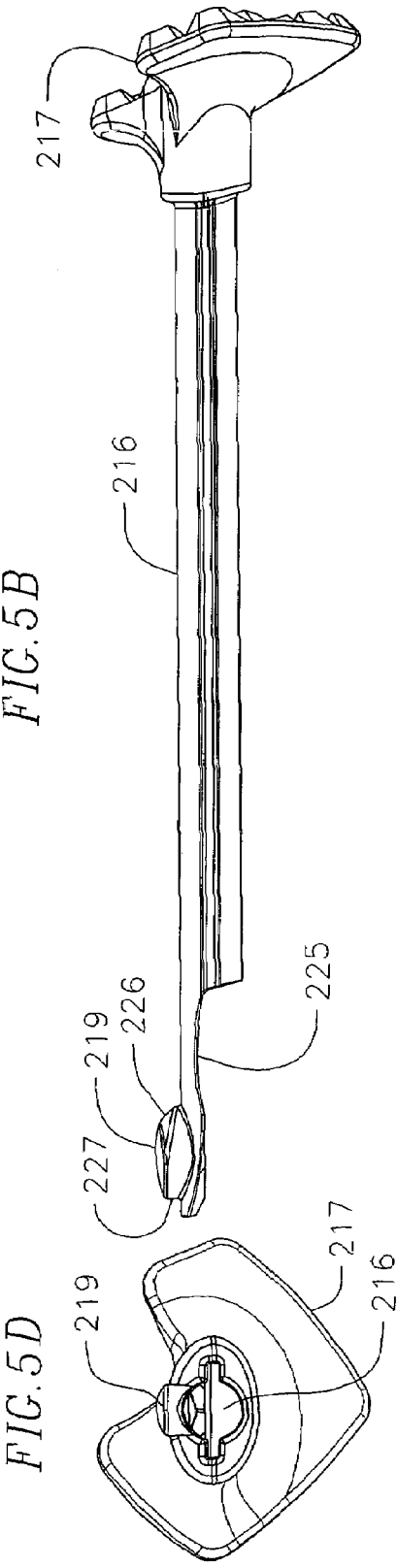

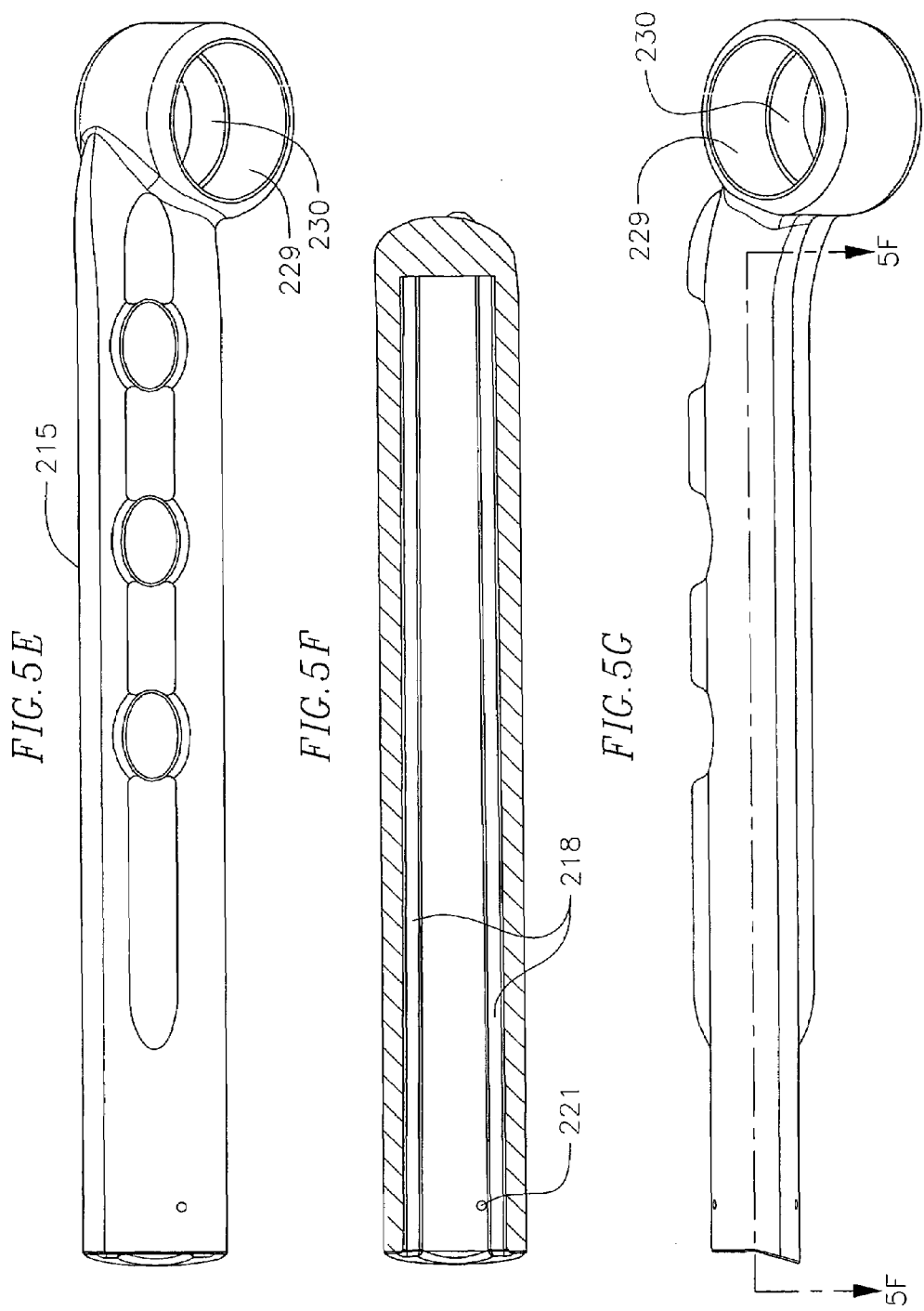

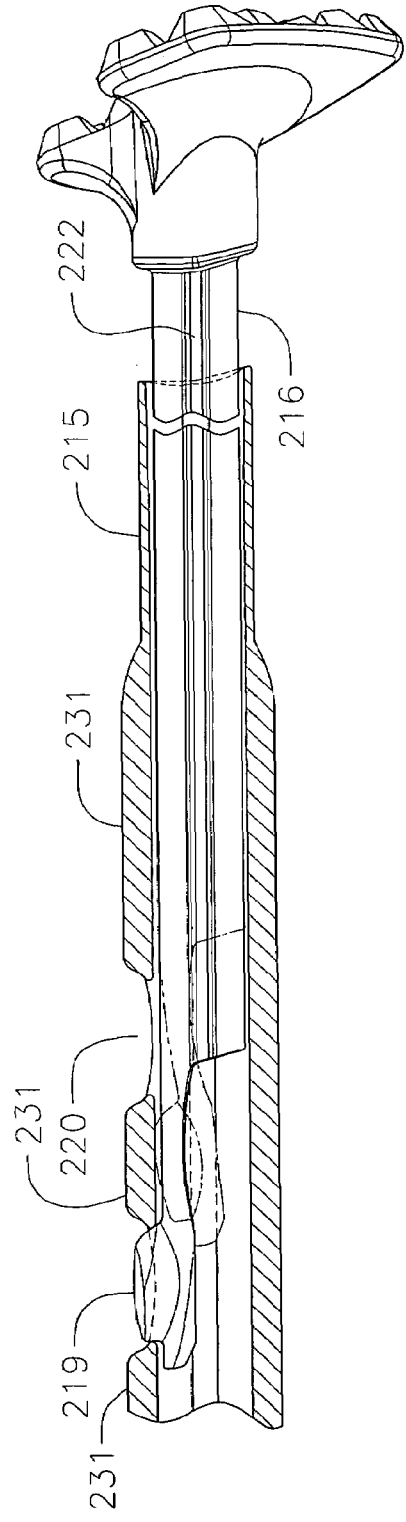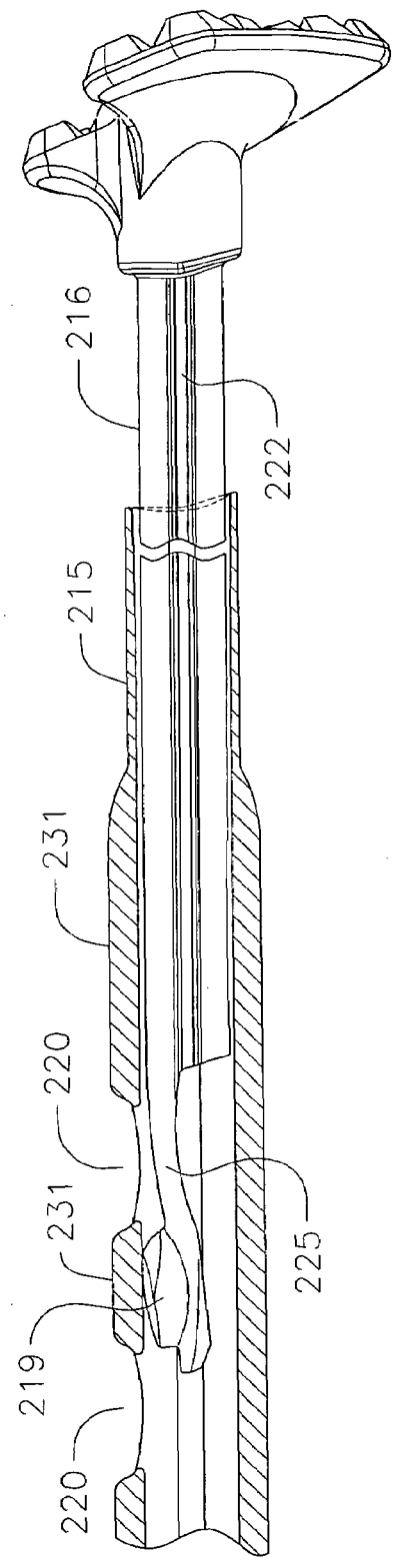

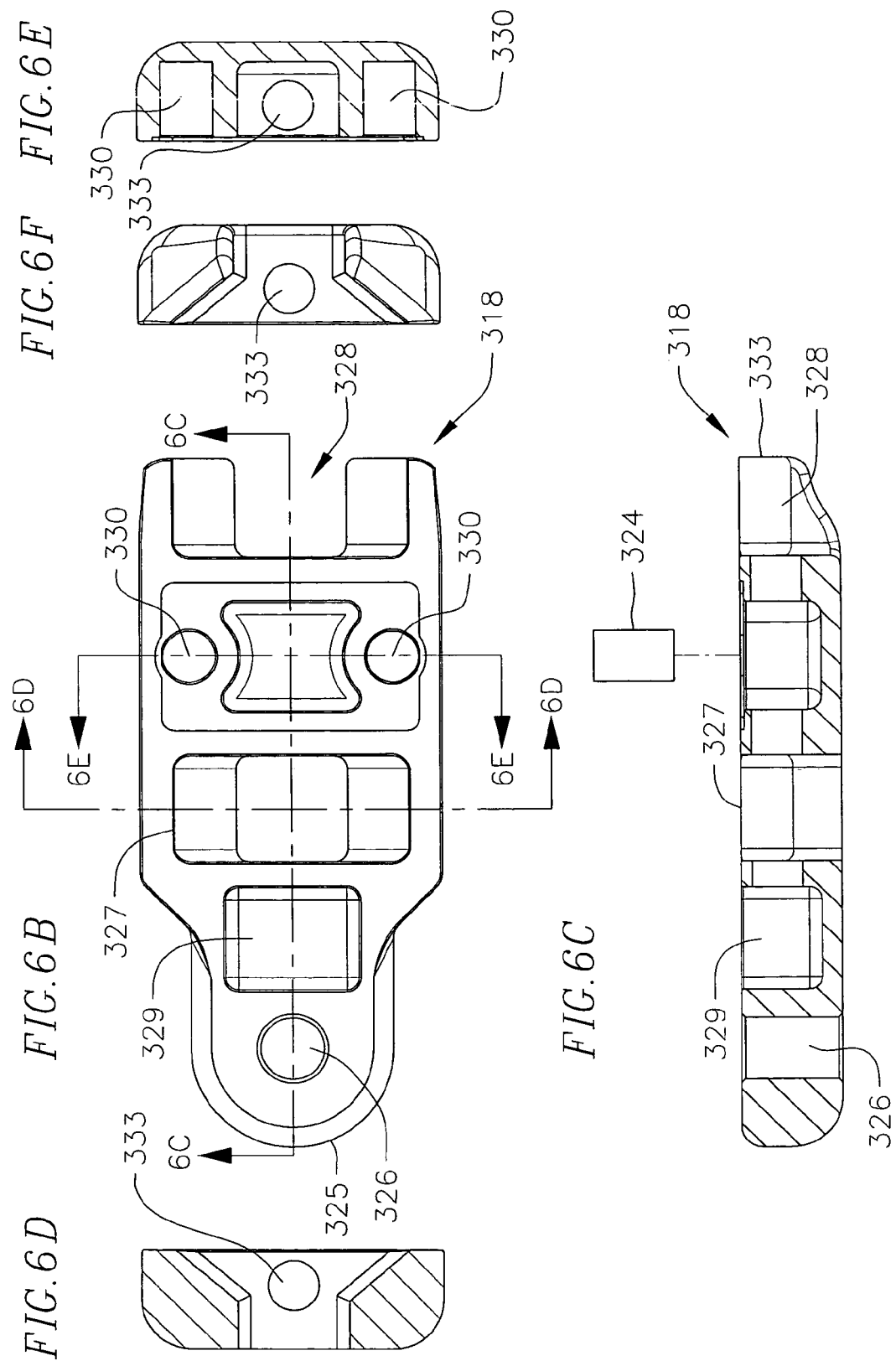

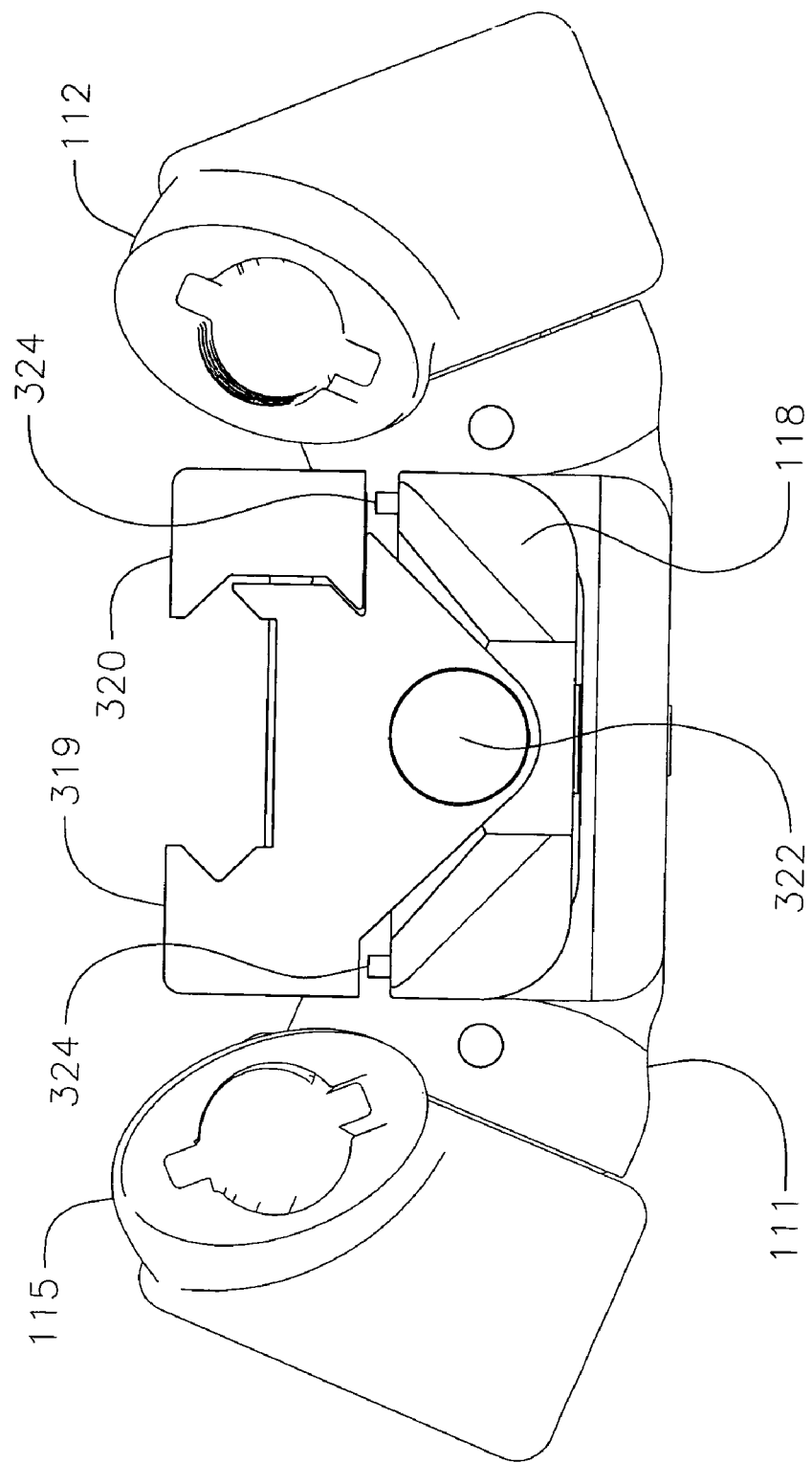

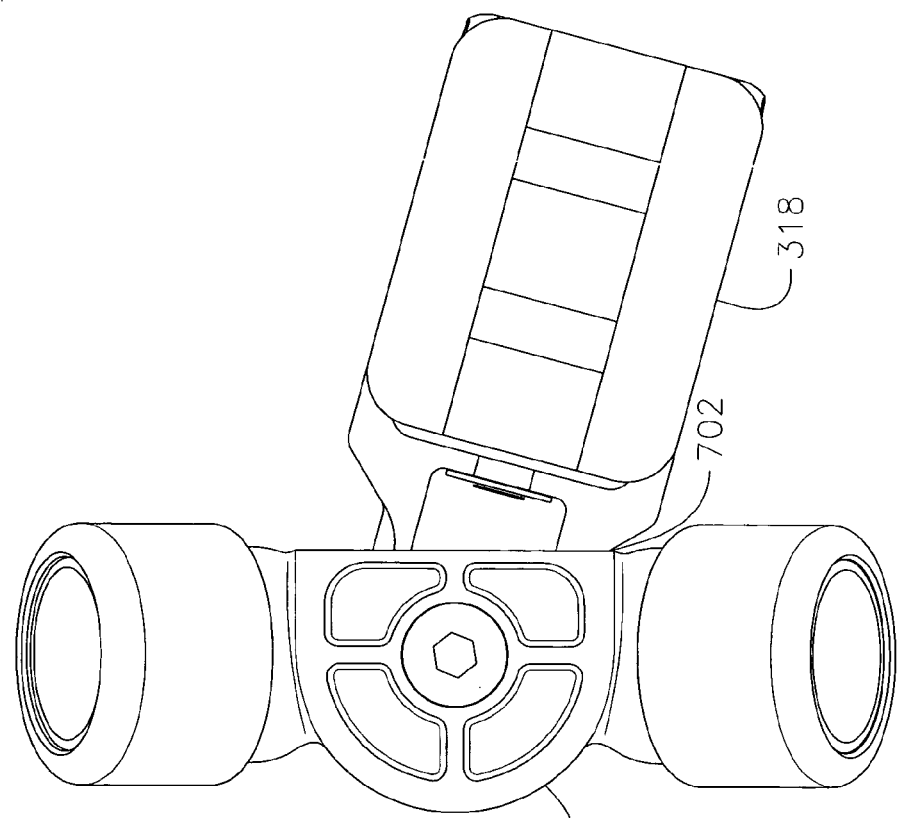
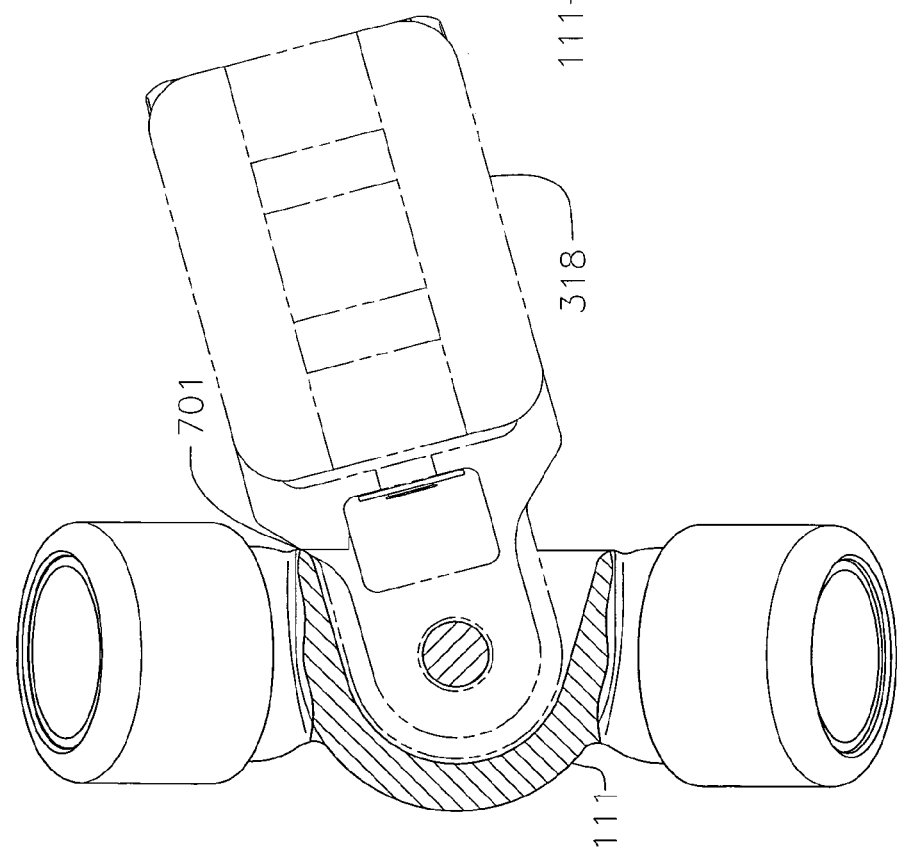

BIPOD

CROSS-REFERENCE TO RELATED APPLICATION

This Application claims the benefit of U.S. Provisional Application Ser. No. 60/742,243, filed Dec. 4, 2005, which is incorporated herein by reference.

FIELD OF THE INVENTION

The present invention generally relates to firearms, and specifically to a lightweight bipod for use with machine guns.

BACKGROUND OF THE INVENTION

Taking a precision shot requires several constants. Among them are the ability of the shooter to acquire the appropriate sight picture, and the ability press the trigger straight to the rear without disturbing the sight picture. The weapon and ammunition should be capable of providing the shooter every advantage to take his best shot. The shooting position has to be stable, but stability is relative depending on the operating conditions. Prone is typically the most stable position, but not everyone's prone position is the same. Tactical and topographical considerations may also preclude the use of conventional prone positions. Further, urban operations may require a stable position off of a roof, or inside a dwelling.

Artificial rests add stability, and may include rucksacks, bean bags and locally acquired debris. The most common and convenient rest is the use of thirty-round magazines that are in the M4 carbines and M16 rifles used by the military. Although it is not optimal on hard surfaces, it is usually present as a necessary supply for the firearms.

Existing bipods are typically heavy and contain a multitude of parts. Further, not all of them can quickly traverse and/or cant without the operator adjusting the position of the legs or loosening and retightening parts. Therefore, there is a need for a lightweight, traversing and canting bipod that can be manually adjusted without the use of tools.

SUMMARY OF THE INVENTION

One embodiment of the invention is a bipod for use with firearms including legs that stow near the firearm body and are easily deployed by rotating and/or extending them away from the firearm. One embodiment of the invention also includes a mounting system that allows the firearm to traverse and or cant.

One embodiment has legs that may be individually rotated using a ball lock system. One embodiment is arranged such that the operator presses a plunger and a leg rotates away from the firearm to deploy, or toward the firearm to stow the legs. A ball lock in one embodiment also contains a stop to prevent over rotation.

One embodiment has telescoping legs and contains an inner and outer component. The operator pulls on the inner leg to deploy it. One embodiment has a tab and button, which are integral parts of the inner legs, and allow the operator to adjust the height of the bipod as necessary. The button may also assist in holding the inner leg in a fully retracted position. One embodiment has a firearm mounting system, or rail clamp, which allows the firearm to traverse and/or cant without the use of adjustment tools. One embodiment has both a center swivel bolt, thereby allowing traverse movement, and a pivot, thereby allowing canting movement.

Other aspects of the invention will be come apparent to those of skill in the art upon reading the following Detailed Description of the Invention and the drawings.

BRIEF DESCRIPTION OF THE DRAWINGS

FIG. 2E is an elevational view of the ball retainer.
FIG. 2F is a cross sectional view of the ball retainer across line 2F-2F of FIG. 2E.
FIG. 2G is an elevational view of the plunger.
FIG. 2H is a cross sectional view of the plunger across line 2H-2H of FIG. 2G.
FIG. 3A is a overhead perspective view of the center swivel.
FIG. 3B is a cross-sectional view of the center swivel across line 3B-3B of FIG. 3A.
FIG. 4A is a cross sectional view of the ball lock across line 4A-4A of FIG. 2A.
FIG. 4B is a cross sectional view of the ball lock across line 4B-4B of FIG. 2A.
FIG. 4C is a partial cross sectional view of the ball lock across line 4C-4C of FIG. 4B.
FIG. 5A is an exploded view of the inner and outer legs with the pin exploded out and rotated.
FIG. 5B is a side perspective view of an inner leg.
FIG. 5C is an overhead perspective view of an inner leg.
FIG. 5D is an end perspective view of the inner leg.
FIG. 5E is an overhead perspective view of the side of an outer leg showing holes.
FIG. 5F is a cross sectional view across line 5F-5F of FIG. 5G.
FIG. 5G is an overhead perspective view of side of an outer leg.
FIG. 5K is a cross sectional view of the inner leg button registered in the outer leg hole.
FIG. 5L is a cross sectional view of the inner leg button not registered in the outer leg hole.
FIG. 6B is a top perspective view of the base plate.
FIG. 6C is a cross-sectional view of the base plate across lines 6C-6C of FIG. 6B.
FIG. 6D is a cross-sectional view of the base plate across lines 6D-6D of FIG. 6B.
FIG. 6E is a cross-sectional view of the base plate across lines 6E-6E of FIG. 6B.
FIG. 6F is a rear view of the base plate in FIG. 6B.

FIG. 6G is a rear view of the rail clamp mounted on the base plate.

FIG. 7C is an overhead and partial cross sectional view of the base plate at a traversing limit.

FIG. 7D is an overhead perspective view of the base plate at a traversing limit.

DETAILED DESCRIPTION OF EXEMPLARY EMBODIMENTS

Figure 1A:
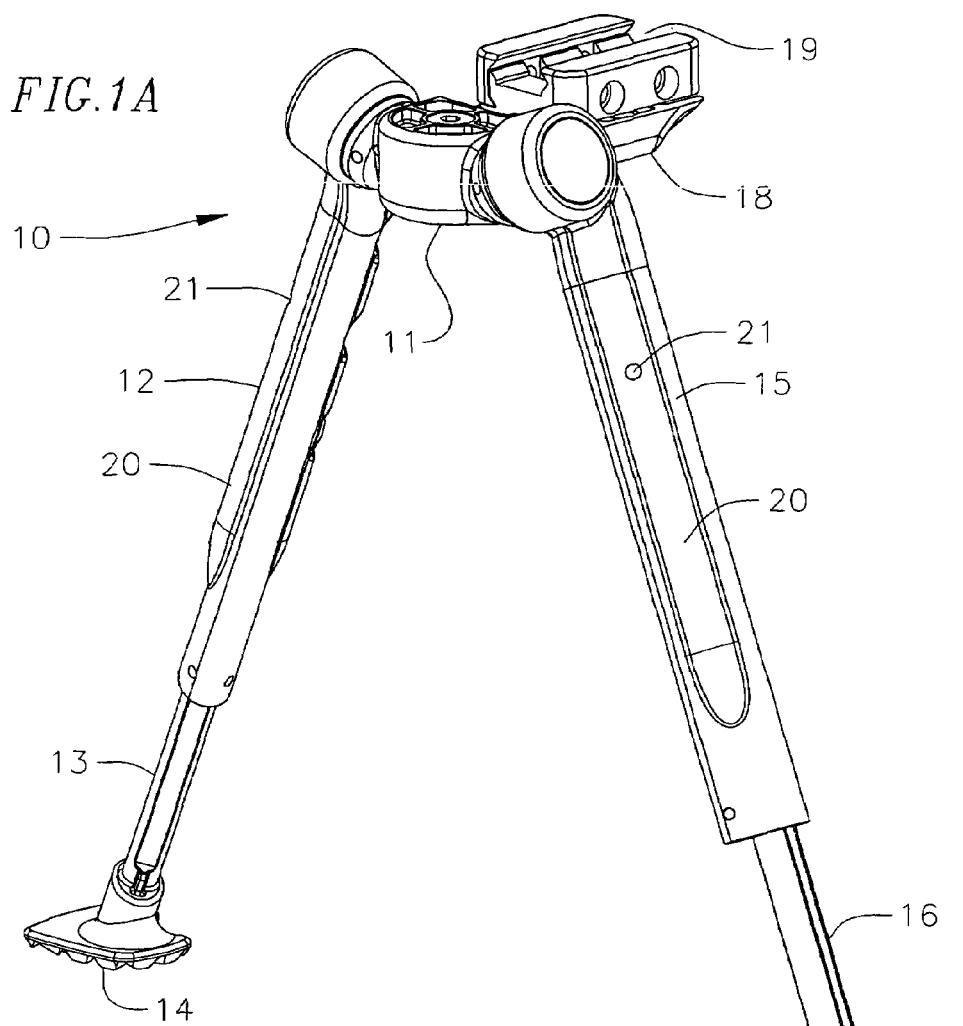
FIG. 1A is a front perspective view of the bipod in the deployed position.
Figure 1B:
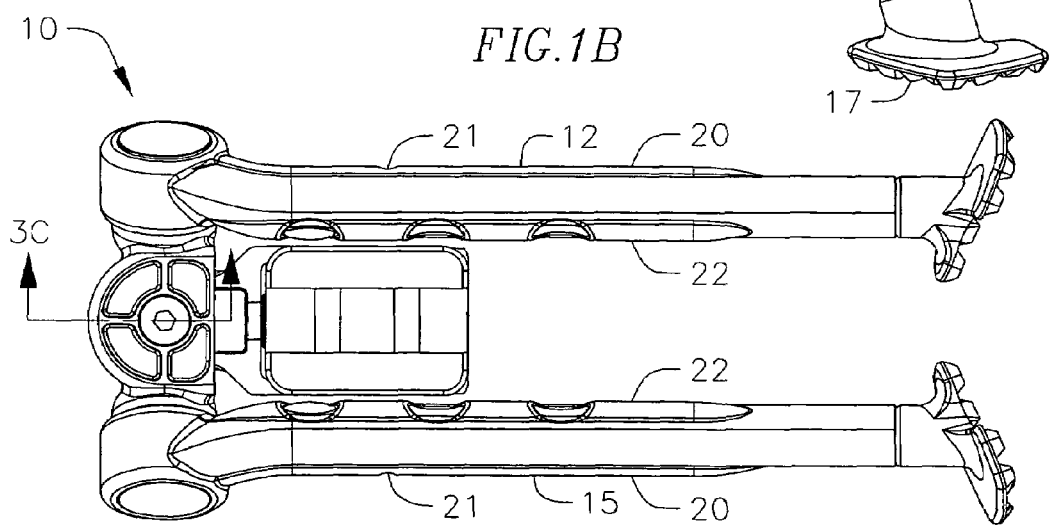
FIG. 1B is a top perspective view of the bipod in the stored position.
Figure 1C:
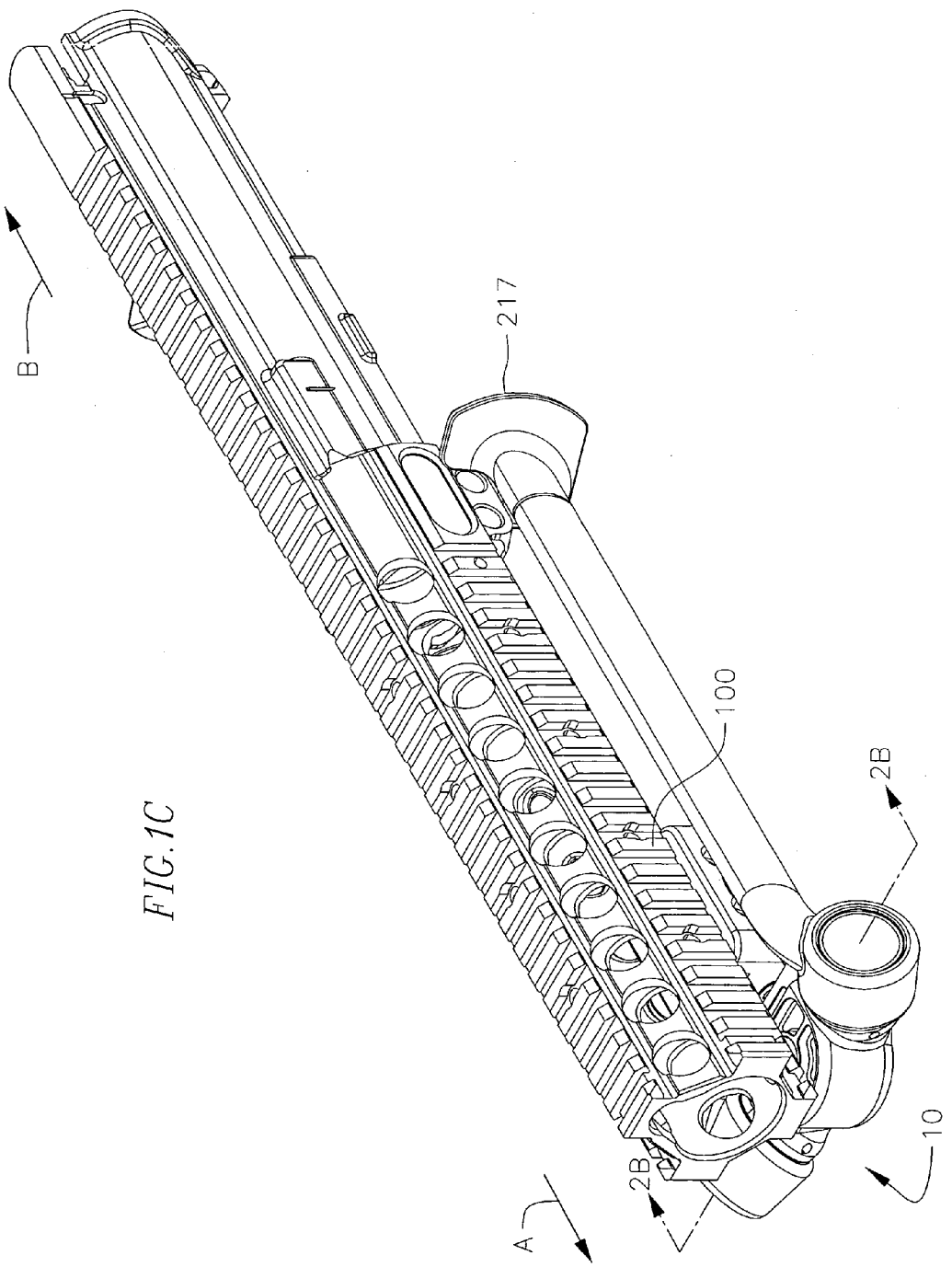
FIG. 1C is a side perspective view of the bipod in the stored position attached to a firearm rail.

Referring to FIG. 1A, a bipod 10 according to one embodiment of the invention has two outer legs 12, 15, that are pivotally attached to a center swivel 11. A cantilevered rail clamp 19 dimensioned for receiving the rail 100 of firearm, is pivotally mounted to a base plate 18, which is in turn pivotally mounted to the center swivel 11. The bipod 10 is shown in a deployed condition with inner legs 13, 16 in a telescoped condition. FIG. 1B shows the bipod 10 in a stored condition with inner legs 13, 16 in a fully retracted condition inside of the outer legs 12, 15. FIG. 1C shows the bipod 10 in a stored condition while attached to a firearm rail 100. The bipod 10 in one embodiment is mounted to the firearm 100 such that in the stored position, the distal ends of the legs are oriented toward the muzzle of the firearm in the direction A depicted in FIG. 1C, or in the stored position such that distal ends the legs are oriented in direction B, away from the muzzle of the firearm.

Figure 2A:
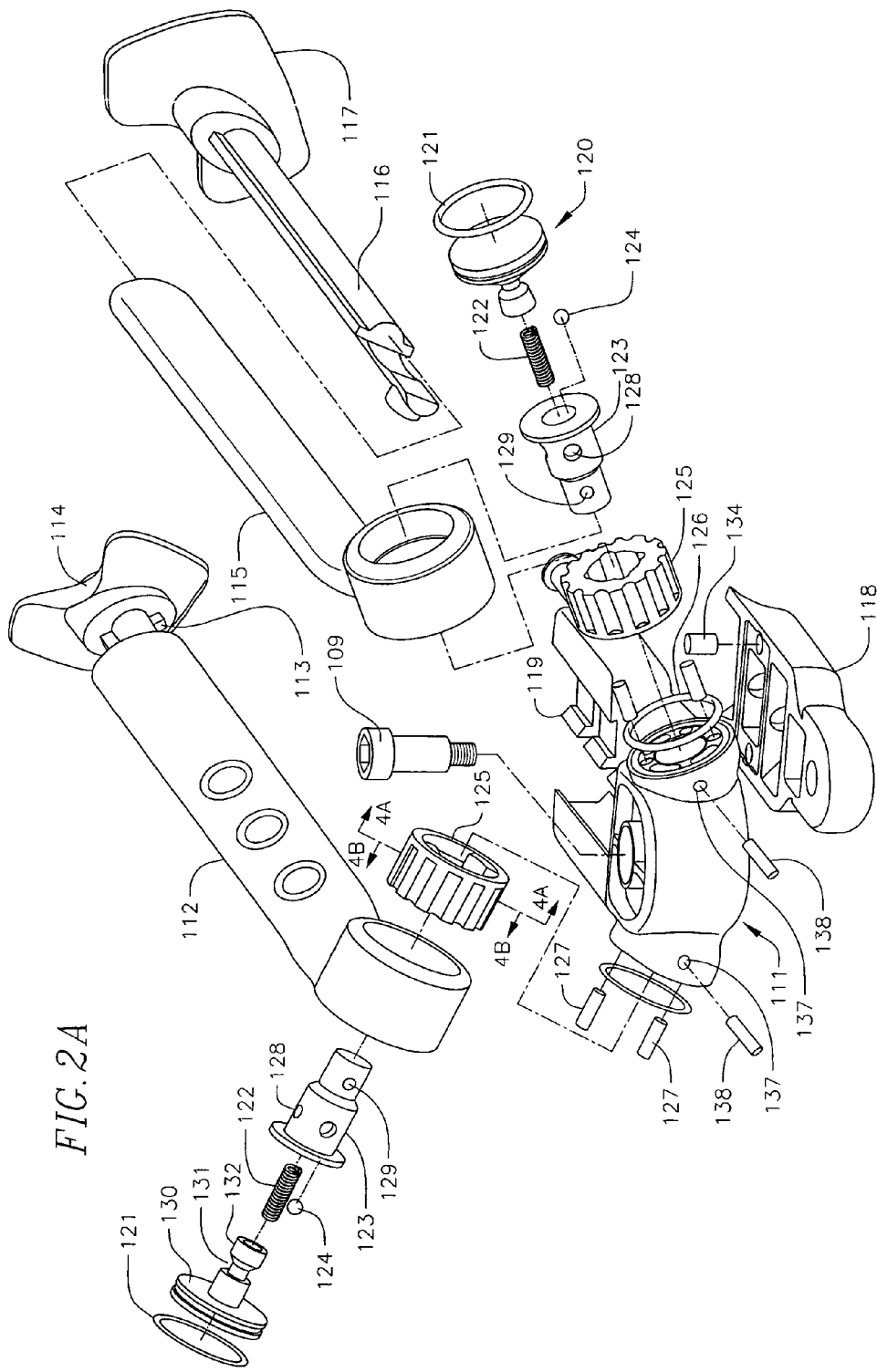
FIG. 2A is an exploded view of the bipod.

In an embodiment of the present invention as illustrated in FIGS. 2A-3C, the center swivel 111 comprises several means for mounting the outer legs 112, 115 and base plate 118. As shown in FIG. 3A, the center swivel contains two swivel leg orifices 136 that accept the ends of the ball retainers 123. In FIGS. 2A, 3A-3B, the center swivel 111 comprises an additional retaining pin orifice 137 in communication with the swivel leg orifices 136, for holding a retaining pin 138. In one embodiment, as shown in FIG. 3B, there are two retaining pin orifices 137 perpendicular to the swivel leg orifices 136 and aligned such that one retaining pin may be inserted through both retaining pin orifices simultaneously. As shown in FIGS. 2A, 2B and 3B, outer leg limiting pins 127 are inserted into the limit pin orifices 141 which surround the swivel leg orifices 136. As shown in FIG. 3A the center swivel contains o-ring grooves 139 for accepting swivel leg orifice o-rings 126, which surround the swivel leg orifice 136 and the outer leg limiting pin orifices 141.

Figure 3C:
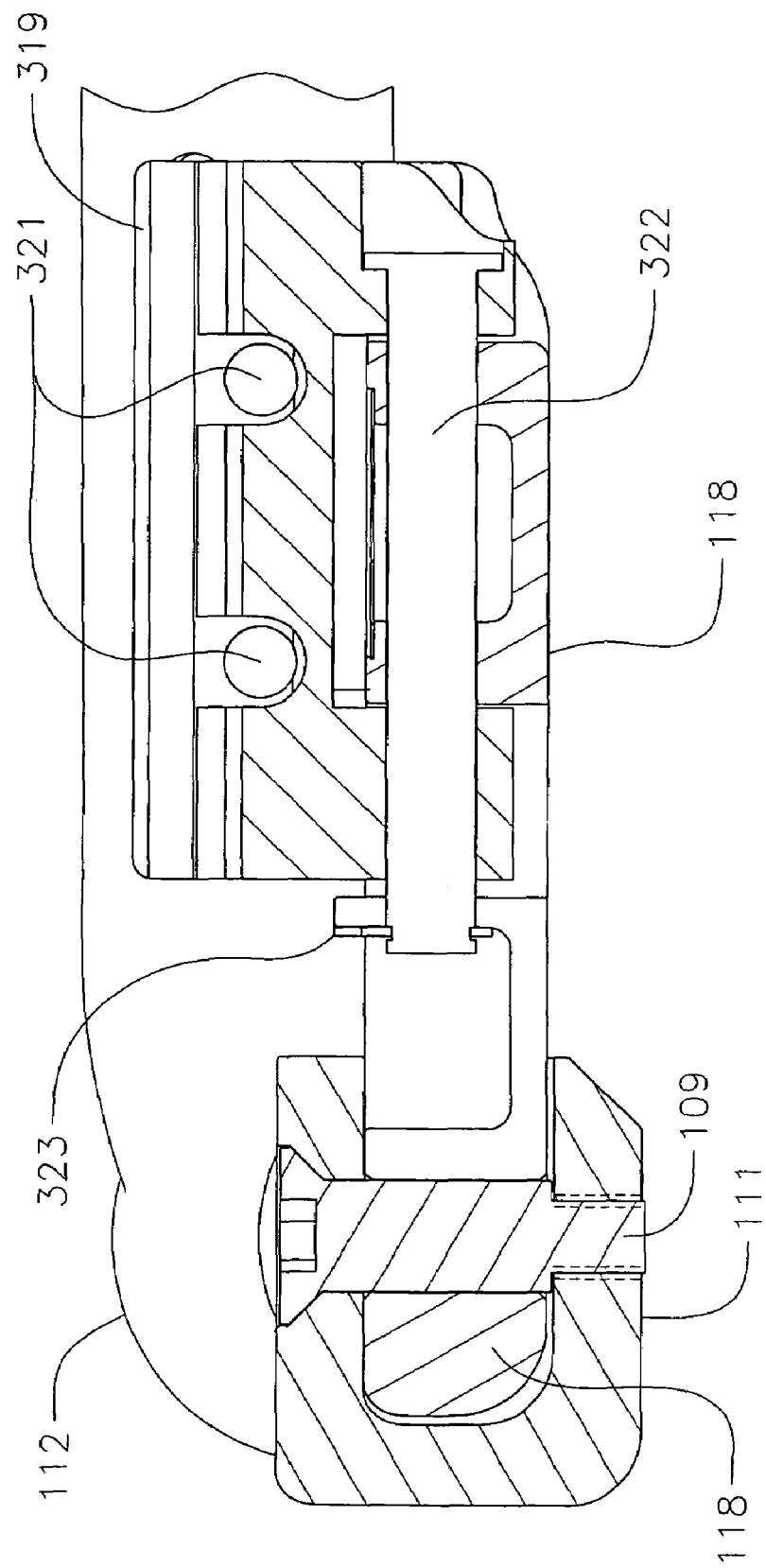
FIG. 3C is a cross-sectional view of the base plate mounting into the center swivel.
Figure 6A:
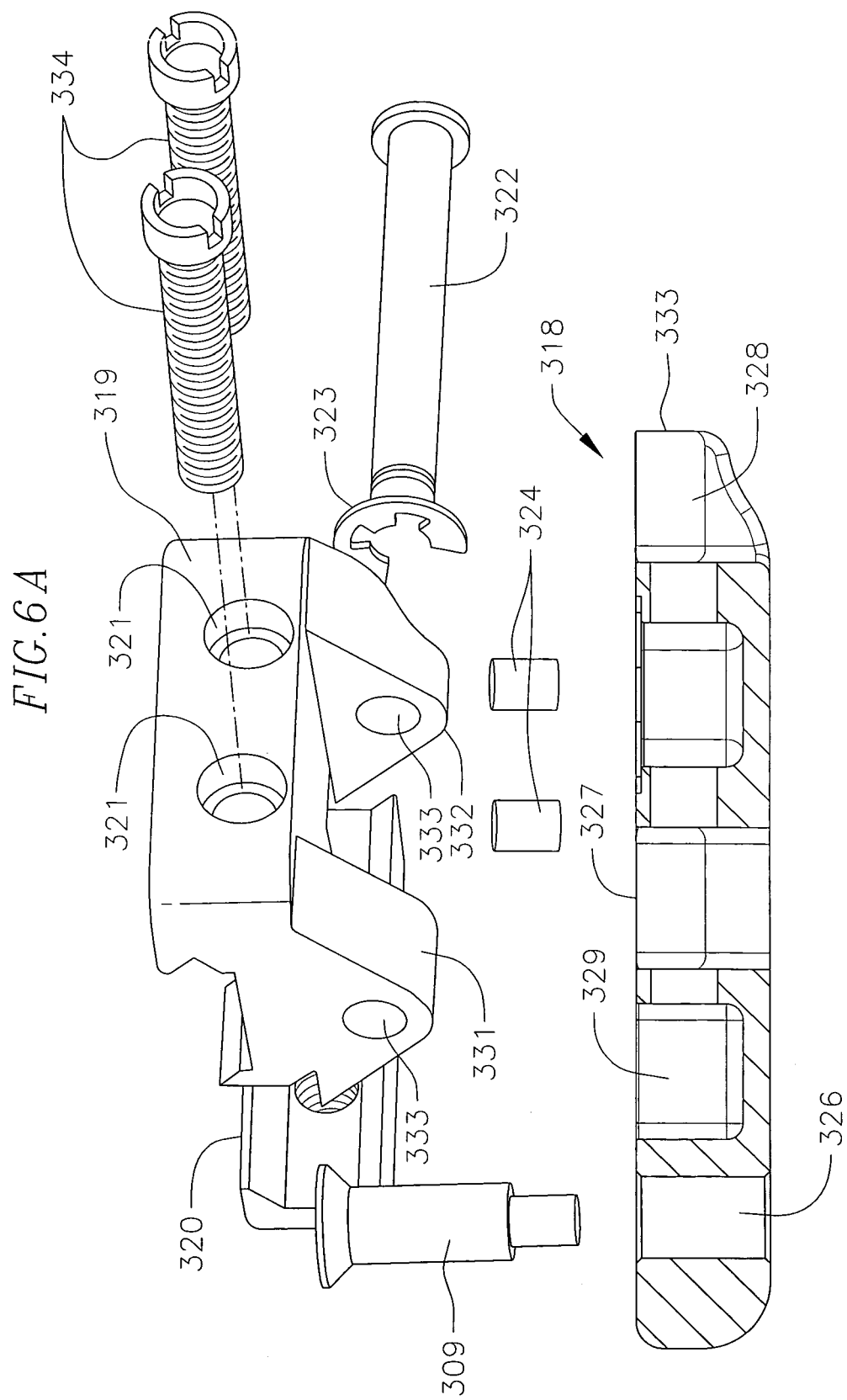
FIG. 6A is an exploded view of the bipod rail clamp assembly with the base plate in a cross sectional view for reference.
Figure 7A:
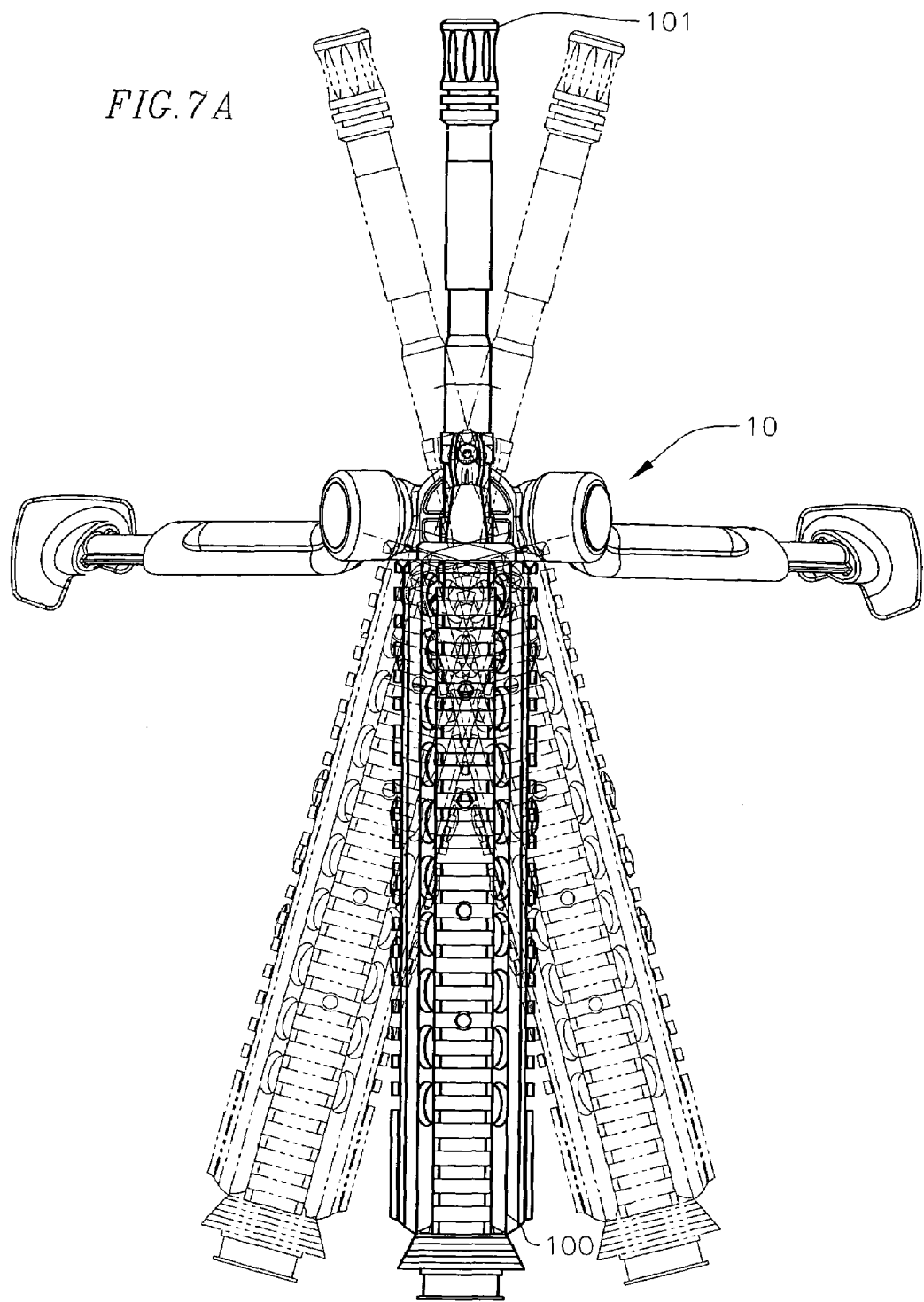
FIG. 7A is an overhead perspective view showing traversing motion of the firearm mounted on the bipod.

In one embodiment, as shown in FIGS. 3B-3C and FIG. 6B, the center swivel 111 has a cavity 140 dimensioned to accept, the end 325 of a base plate 118 and allow traversing motion. The center swivel 111, comprises, as shown in FIGS. 3A-3C, a swivel bolt orifice 142 for accepting center swivel shoulder bolt 109, which is used to attach a base plate 118 while allowing it to traverse. In one embodiment, the shoulder bolt 109 has an Allen head and screws into the bottom of the center swivel, although other securing devises, such as pins may be used. One embodiment as shown in FIG. 7A allows a firearm rail 100 and barrel 101 to traverse and is often desired because traversing motion allows a firearm operator to smoothly track a target. One embodiment allows the firearm to traverse up to 40 degrees in each direction, and in another embodiment, up to 45° in either direction. As shown in FIG. 6A, there is a hole 326 in base plate 118 dimensioned to accept a center swivel shoulder bolt 309, thereby allowing traversing motion. In one embodiment, as shown in FIGS. 7C and 7D, the limit of traverse occurs when the base plate 318 hits point 701 or point 702 on the center swivel 111.

In one embodiment, as shown in FIGS. 2A-4C, the outer legs are secured to the center swivel 111 using a ball lock 125. Each of the two ball lock leg combinations is a mirror image of the other and only one will be discussed as follows. As shown in FIG. 2A, the ball lock 125 is a substantially round insert housed in the proximal end of the outer leg 112 securing the leg to the center swivel 111. In one embodiment as shown in FIGS. 5E-5J, the outer leg 215 has a cavity with two different diameters 229,230 dimensioned to accept the ball lock 125 as shown in an assembled view in FIG. 2B, which is pressed into a preformed outer leg 112, although the leg may also be formed around the ball lock 125. As shown in FIGS. 4A-4C, the ball lock 125 contains a substantially round orifice 136 and a lip around the circumference closest to the grooves 135 as illustrated in 4C. In one embodiment, as shown in FIGS. 4A and 4C, one side of the ball lock 125 contains notches 133 in the orifice 134 for a ball bearing 124 (shown assembled in FIGS. 2C-2D). FIG. 2B illustrates two ball bearings 124 in each ball lock 125, although only one ball bearing is necessary, and up to four may be used depending on the tolerances of assembly with four requiring a tighter tolerance. In one embodiment, referring to FIGS. 4B, 4C the other side of the ball lock 125, which is shown in FIG. 2B, is in contact with the center swivel 111, contains limiting grooves 135 as shown in FIG. 4B for limit pins 127. As shown in FIG. 4C, each notch 133 is deep enough to allow a portion of the ball bearing to rest within it. As shown in FIG. 2A, and 2D-2F, the ball bearing 124 is held within a ball retainer 123. In one embodiment, as shown in FIGS. 2E-2F, the ball retainer comprises a lip 145, a wide cylindrical portion with one to four orifices 128 for a ball bearing 124, and a reduced diameter cylindrical portion with one or two orifices 129. In one embodiment as shown in FIG. 2F, the wide cylindrical portion includes a bore. As shown in 2A and 2B, the ball retainer 123 comprises an orifice 128 that is dimensioned such that only a portion of the of the ball bearing 124 can protrude through the orifice 128. The ball retainer 123 further comprises a retaining pin hole 129, which allows it to be pivotally attached to the center swivel 111. In one embodiment as illustrated in FIG. 3B, the retaining pin hole 129 goes entirely through the ball retainer 123. As illustrated in FIG. 2A, after the ball bearing 124 is inserted into the ball retainer 123, a plunger return spring 122 is inserted, followed by a plunger 120 with a plunger o-ring 121. The spring 122 may also be inserted after the ball bearing 124. As shown in FIGS. 2G and 2H, the plunger 120 comprises a disk 130 and stem 146 with a reduced diameter section 131 between the bearing end 132 and the disk 130 of the stem 146. In one embodiment, the stem 146 comprises a beveled edge 143 at the transition between the bearing end 132 and the reduced diameter section 131. In one embodiment, as shown in FIG. 2H, the plunger comprises a bore 144, dimensioned to accept a spring 122 as shown in FIG. 2D. In one embodiment the relief angle of the bearing surface 132 is less than 90 degrees from horizontal to provide a more gradual release of force on the ball bearing 124 when the plunger is depressed. As shown in FIG. 2G, the disk 130 comprises a groove 147 for an o-ring 121 as shown in FIG. 2A. When the outer legs are in a locked position, either deployed or stored, as shown in FIG. 2C, the plunger 120 is in a non-depressed condition such that ball bearing 124 rests tightly on the bearing end 132 while in a notch 133. One end of spring 122 rests in the bore 144 the plunger stem 146 and the other end rests on the base of the bore 148 of the ball retainer 123. In one embodiment, the spring 122 is designed and dimensioned such that when the plunger 120 is in a non-depressed condition as illustrated in FIG. 2C, the spring 122 applies enough force to keep the ball bearing 124 in contact with the bearing end 132. Additionally, the spring 122 supplies resistance when force is applied, typically by an operator, to the plunger 120, by trying to return the plunger 120 to the non-depressed position. In one embodiment, as shown in FIG. 2D, when the plunger 120 is depressed such that the reduced diameter section 131 aligns with the ball bearing 124, the ball bearing 124 no longer rests tightly against the bearing end 132 and thus may leave the notch 133 in the ball lock 125, allowing the outer leg to be rotated. At this time, to lock the outer leg, the plunger 120 is released so that it returns to a non-depressed condition as shown in FIG. 2C. This allows plunger 120 to establish contact with the ball bearing 124 by transitioning from the reduced diameter section 131, to the beveled edge 143, and onto the bearing end 132. In one embodiment, as shown in FIGS. 2A and 2B, limiting pins 127 are attached to the center swivel 111, and lie within the limiting grooves 135 of the ball lock 125, and serve to limit the range of motion of the outer legs.

As shown in FIG. 5A, the outer leg 215 is hollow and allows inner leg 216 to axially slide within it. In one embodiment of the invention the outer leg 215 is oval in shape and each inner leg 216 also has a foot 217 at its distal end with a gripping surface to prevent lateral movement on various surfaces such as solid ground or sand. Each outer leg/inner leg combination is a mirror image of the other and only one will be discussed below.

Figure 5H:
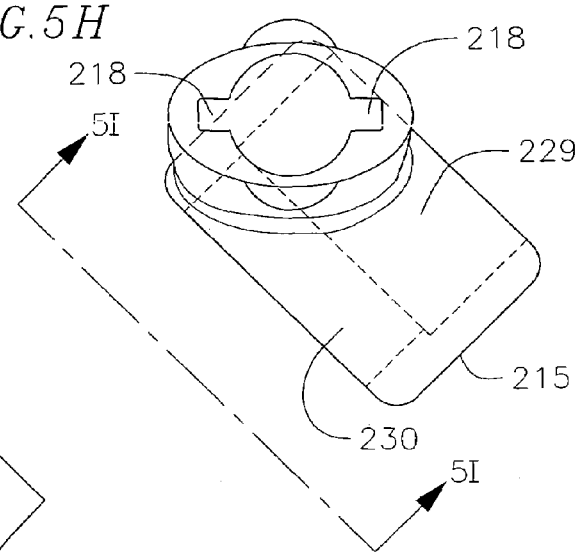
FIG. 5H is an end perspective view of an outer leg.
Figure 5I:
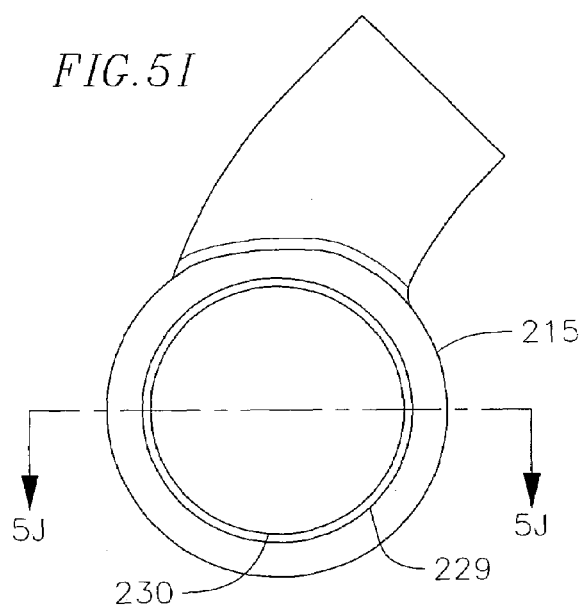
FIG. 5I is an elevational view in the direction of line 5I-5I of FIG. 5H.
Figure 5J:
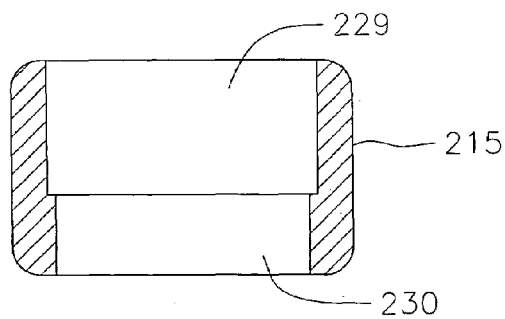
FIG. 5J is a cross sectional view across line 5J-5J of FIG. 5I.

In one embodiment of the invention, as show in FIG. 5C, inner leg 216 comprises a backbone, rails 222, 223, a tab 225, button 219, and a foot 217. The backbone of the inner leg 216 is solid and substantially circular in shape with two rails 222, 223 that run parallel to the backbone of the inner leg 216. The first rail 222 runs continuously from the tab 225 to the foot 217 of the inner leg 216. The second rail 223 is located 180 degrees from the first rail 222 and has a gap 224 along its length closest to the distal end of the inner leg 216. These rails 222, 223, among other things, prevent the inner leg 216 from twisting within the outer leg 215. As show in FIGS. 5A, 5F, and 5H, the outer leg 215 contains two slots 218 which are dimensioned to accept the rails 222, 223 of the inner leg 216, and to allow the inner leg 216 to slide axially with respect to the outer leg 215. In one embodiment, the outer leg 215 also contains a hole 221 near its distal end and near a groove 218, which accepts a stop pin 228. This stop pin 228 slides along the gap 224 as the inner leg 216 is telescoped in or out of the outer leg 215 and serves as a limit stop. When the stop pin 228 reaches the ends of gap 224, the inner leg 216 is either fully telescoped or fully retracted. In one embodiment, the outer leg may include additional clearing holes 21 as show in FIG. 1A. When pushing the inner leg 16 within the outer leg 15, these holes 21 aid in clearing any debris, such as sand, that is lodged in the outer leg. In one embodiment as shown in FIGS. 1A and 1B, the outer legs also comprise raised ridges 20 and 22 with holes 220 as shown in FIG. 5A. As shown in FIGS. 1B and 1C, the outer and inner legs are dimensioned such that when the inner legs are in the fully retracted position, and the outer legs are fully stowed against the firearm, no vital parts of the firearm, such as an ejection port, are obstructed. In one embodiment the bipod does not interfere with the vertical fore grips, rail panels, tactical lights, or lasers (not shown) on a firearm. In one embodiment, as shown in FIG. 5D, portions of the feet 217 may be designed to accommodate any protruding features on the firearm rail, or the firearm itself. In one embodiment, the feet 217 are dimensioned with a large amount of surface area and an effective non-skid mechanism, such as teeth, for maximum floatation and traction on sand, mud, earth, ice, and concrete.

In one embodiment, as shown in FIGS. 5A-5D, to secure the inner leg 216 with respect to the outer leg 215 at various relative positions, the inner leg 216 has a button 219 on a flexible tab 225 molded into the proximal end of the leg 216. In one embodiment, as illustrated in FIGS. 1A and 1B, the outer leg 215 has raised ridges 21 on the outer surface. In one embodiment, as shown in FIG. 5A, the outer leg has a series of holes 220 dimensioned to receive a button 219 and the raised ridges 231 are approximately the same width as the button 219 and are slightly taller than the button 219 when said button is in registration with the holes 220 as illustrated in FIG. 5K. In one embodiment, the raised ridges 231 serve to keep the button 219 from being accidentally depressed, allow easy access to the button 219 with gloved hands, and also serve as an insulating surface when the outer legs 215 are in a stowed position near a hot firearm as in FIG. 1C. In one embodiment of the invention, as shown in FIG. 5A, the holes 220 and the button 219 are oval in shape and are oriented with the major axis parallel to the long axis of the outer leg 215. In one embodiment, as shown in FIG. 5K, the button 219 extends through the holes 220 when the inner leg 216 brings the button 219 in registration with the holes 220, and by doing so prevents the inner leg 216 from sliding with respect to the outer leg 215. In one embodiment, as shown in FIGS. 5B and 5K, the top of the button 219 is curved and has a sloping end 226 that allows the edge of the holes 220 to flex the tab 225 inward, while an operator pulls on the foot 217 of the inner leg 216. This allows the inner leg 216 to slide out of the outer leg 215 without having to depress the button 219. In one embodiment, the button 219 also has a non-sloping, essentially vertical end 227 which will catch on the holes 220 when the inner leg 216 is pushed into the outer leg 215. In order to push the inner leg 216 further, the button 219 needs to be depressed and held such that the button 219 goes out of registration of the holes 220, while the inner leg 216 is pushed into the outer leg 215. In one embodiment, the tab 225 is molded such that there is a resisting force that discourages flexing and or bending. The tab 225 in FIGS. 5A and 5K is shown in a resting mode. When the inner leg 216 is inserted into the outer leg 215 and the tab 225 registers through a hole 220, there is substantially no resisting force in the tab 225. As shown in 5L, as the button 219 is depressed, the resisting force opposes the depression force and acts to return the button 219 to the resting position. In one embodiment of the invention, the tab may be replaced with a button and spring combination mounted on the backbone of the inner leg, where the spring would provide the resisting force.

Figure 2B:
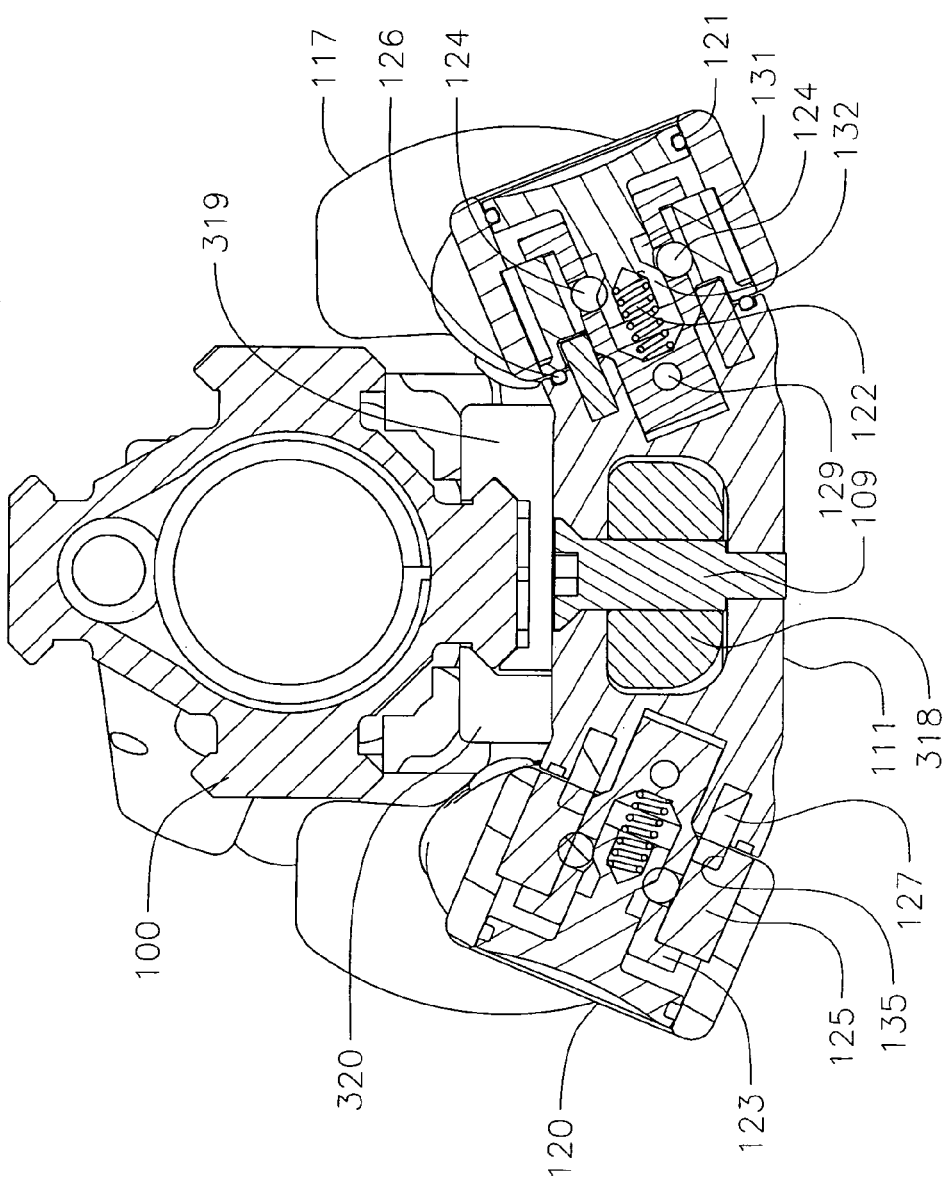
FIG. 2B is a cross sectional view of the stored bipod across the line 2B-2B in FIG. 1C.
Figure 2C:
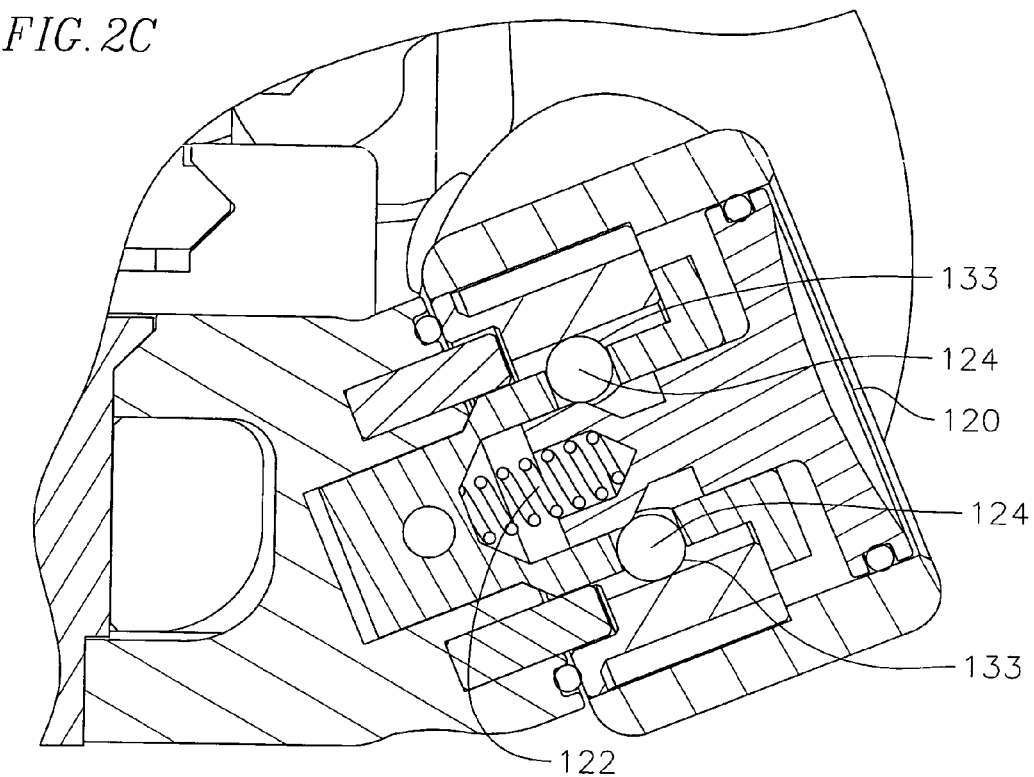
FIG. 2C is a cross sectional view of the ball lock in a non-depressed state.
Figure 2D:
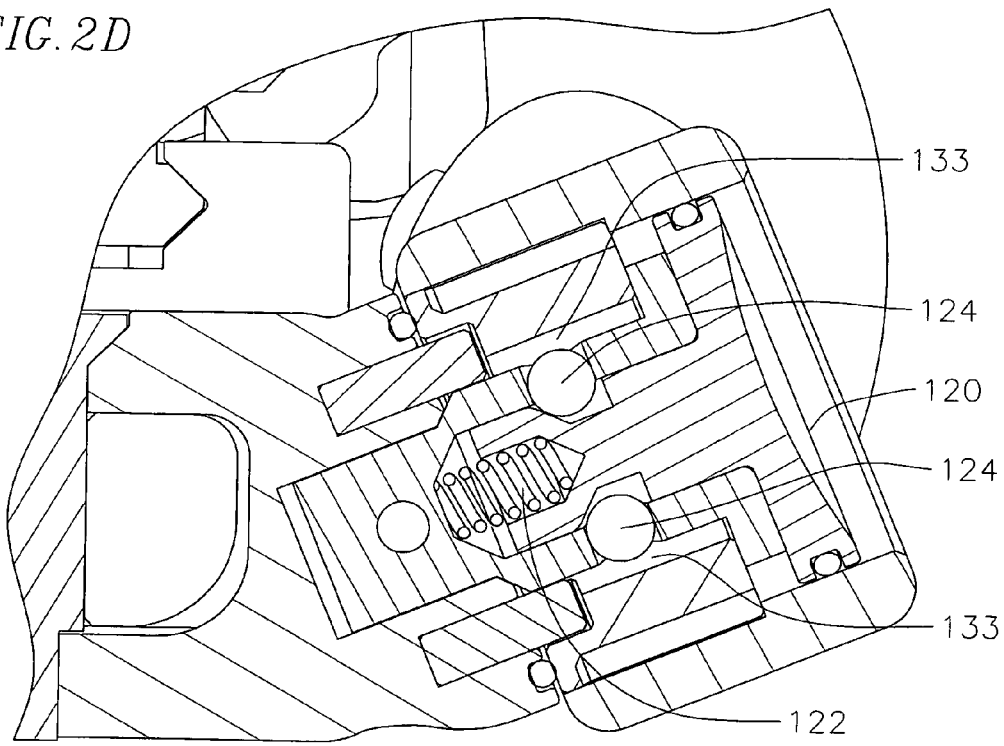
FIG. 2D is a cross sectional view of the ball lock in a depressed state.
Figure 6I:
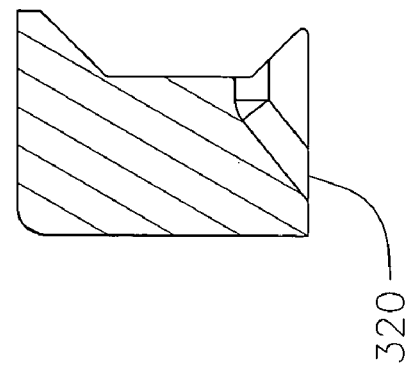
FIG. 6I is a cross sectional view of the rail clamp across line 6I-6I of FIG. 6H.
Figure 6H:
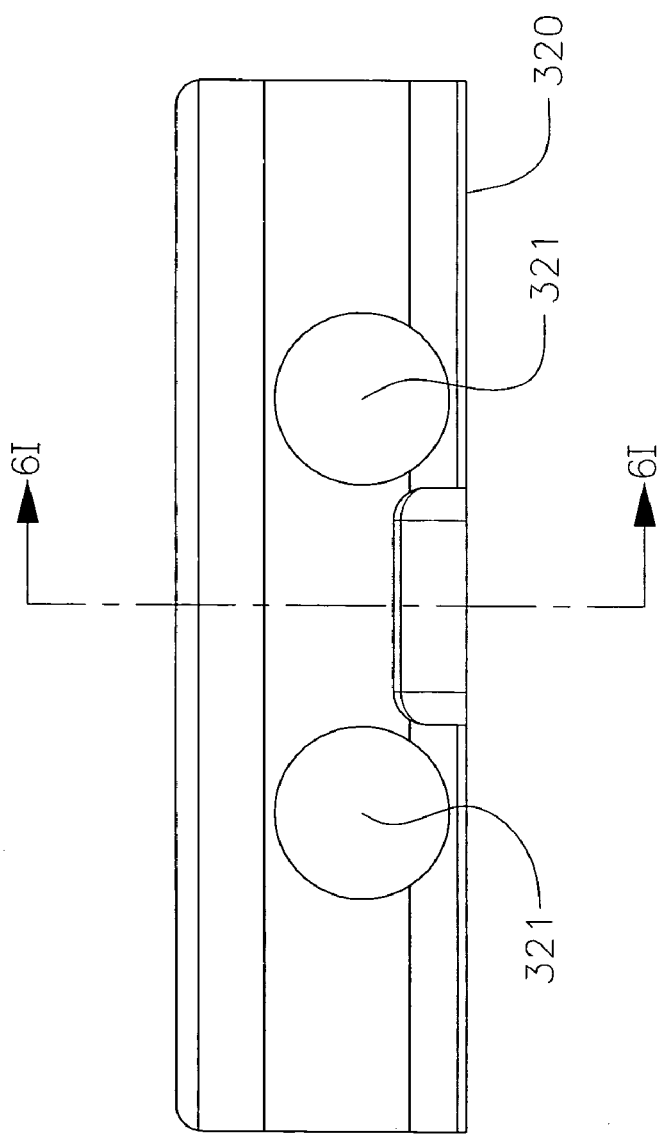
FIG. 6H is an elevational view of the rail clamp.
Figure 7B:
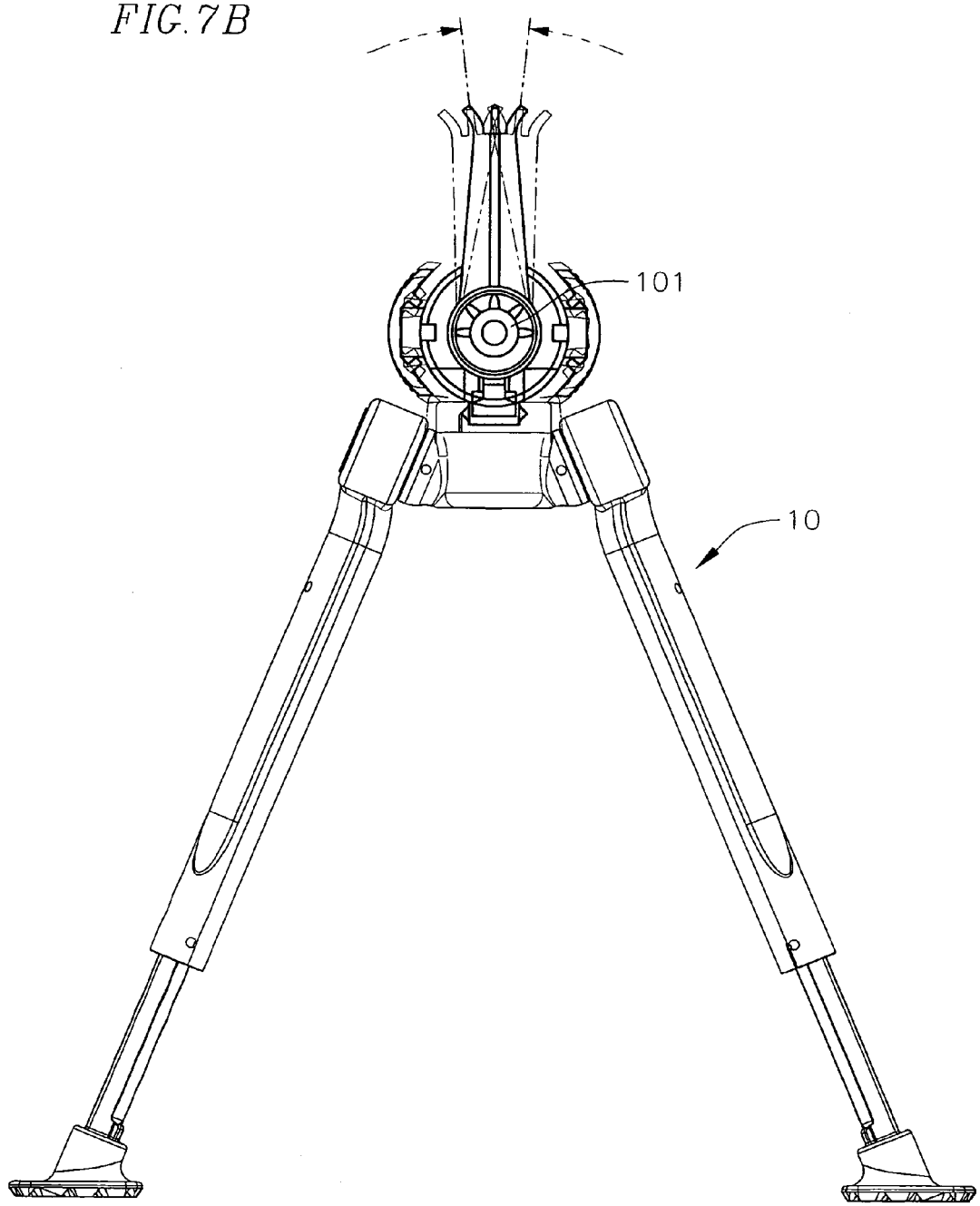
FIG. 7B is a front elevational view showing canting motion of the firearm mounted on the bipod.

One embodiment of the invention allows a firearm rail 100 and barrel 101 to cant, as shown in FIG. 7B, without having to laterally adjust the position of the legs. One embodiment allows the firearm to cant up to 15 degrees in either direction, and in another embodiment, up to about 22.5° in either direction. Canting motion allows simple vertical sight correction of the firearm over slightly irregular ground. In one embodiment, as shown in FIG. 2B, a firearm rail 100 is attached to a rail clamp 319, which is in turn attached to a base plate 318. In one embodiment, as shown in FIG. 6A, the rail clamp 319 comprises a rail clamp bar 320 and bores 321 for rail clamp bar fasteners 334 in which the fasteners 334 are captured threaded screws that can be turned with a flat bladed screwdriver or hex head wrench. In one embodiment, the rail clamp 319 and rail clamp bar 320, as shown in FIGS. 6H and 6I, are dimensioned to accept M4 carbines and M16 rifles, where the rail clamp 319 attaches to a Picatinny designed Mil-Std-1913 rail. In one embodiment, the rail clamp 319 comprises two rounded journals 331, 332 on the bottom with holes 333 for accepting a rail clamp pivot pin 322. The ability to pivot around pin 322, as shown in FIG. 6G, allows the firearm to cant without laterally moving the legs of the bipod. In one embodiment, as shown in FIGS. 6A and 6B, the base plate 318 has one end 325 that as been rounded and dimensioned to fit into a slot 140 on the center swivel as shown in FIGS. 3B and 3C. In one embodiment, referring to FIGS. 6A and 6B, the base plate 318 also has a circular groove 329 which allows a retainer 323 to be put on the end of a rail claim pivot pin 322. In one embodiment a split ring type of retainer 323 is used, but any retaining means such as a nut may be used. In one embodiment, the base plate 318 also has two rounded grooves 327 and 328 sized to accept the rounded lobes 331 and 332 on the rail claim 319 and rounded grooves 327 and 328 contain holes at the bottom, as shown in FIG. 6, dimensioned such that the lobes 331, 332 do not touch the base plate 118. The pivot pin 322 carries the load from the rail clamp 319 to the base plate 318. In one embodiment, there are two holes 330 on the base plate 318 that accept buffers 324 in the shape of solid cylinders, which limit and resist cant of the rail clamp 319. In one embodiment, silent buffers such as neoprene solid cylinders are used, but any solid material may be used, including plastics, polymers, metals, rubber, and the like. In one embodiment as shown in FIGS. 6C-6F, there is also a hole 333 running length wise through the base plate 318 dimensioned to accept the rail clamp pivot pin 322. In one embodiment as shown in FIG. 6G, as the rail clamp 319 is pivoted around 322 to one side, the rail clamp 319 will contact a buffer 324 which will resist and/or limit further canting. If the rail clamp is pivoted in the opposite direction, the rail clamp bar 320 will contact a buffer 324, thus resisting and/or limiting further canting in the opposite direction.

In an embodiment the major components of the bipod may be constructed of metal, including aluminum, stainless steel, etc. and although this construction produces a strong bipod, it may be too heavy for certain operations. In one embodiment, certain components may be constructed of plastics, carbon fiber, resins, rubber and other solid materials. In one embodiment, the outer legs and base plate are injection molded with CELSTRAN™ available from Entec Polymers, Inc. The molded parts from this resin may withstand temperatures up to approximately 700° F. In one embodiment, the inner legs are injected carbon fiber and the center swivel and rail clamp assembly are 7071 T6 aluminum with a type III hard anodized coat, and the remainder of the assembly is heat treated stainless steel that is sealed with o-rings. In one embodiment, the leg joints at the center swivel are pre-lubricated and sealed, and thus minimal maintenance is required to keep them functioning properly because environmental elements, such as sand, can be merely brushed off or rinsed with water. Additionally, because the bipod is modular in construction, should any portion suffer damage, it can be replaced with common tools in the field. One embodiment of the invention is essentially silent in operation, with no external springs to resonate with sound when accidentally struck.

While the invention has been described in connection with what are considered to be exemplary embodiments, it is to be understood that the invention is not limited to the disclosed embodiments, but on the contrary, is intended to cover various modifications and equivalent arrangements included within the spirit and scope of the appended claims.

What is claimed is:

1. A bipod for a firearm comprising:
    a body having cutout portions therein;
    a bipod base pivotally mounted to said body;
    a firearm mounting bracket dimensioned to secure a firearm and pivotally mounted to said bipod base; and
    a pair of legs each pivotally mounted to said body with a ball lock mechanism, each ball lock mechanism comprising a ball lock a plunger movable with respect to the ball lock, and a ball movable between a first locked position in which the ball is received in a recess in the ball lock to prevent rotation of the ball lock with respect to the body and a second unlocked position in which the ball is received in a recess in the plunger to allow rotation of the ball lock with respect to the body.

2. The bipod of claim 1, wherein each leg can be individually pivoted.

3. The bipod of claim 1, wherein the legs are telescoping legs.

4. The bipod of claim 1, wherein the firearm mounting bracket comprises:
    a firearm rail clamp dimensioned to receive a firearm rail and pivotally mounted to the bipod base.

5. The bipod of claim 4, wherein the rail clamp is dimensioned to accept Picatinny designed Mil-Std-1913 rails.

6. The bipod of claim 1, wherein the firearm mounting bracket may pivot through a range of about 45°.

7. The bipod of claim 1, wherein the bipod base may pivot through a range of about 90°.

8. The bipod of claim 1, wherein the plunger is biased into a first position in which the plunger retains the ball in the recess of the ball lock to thereby prevent rotation of the ball lock with respect to the body, and wherein the plunger is movable into a second position in which the recess of the plunger aligns with the ball and allows the ball to move out of the recess of the ball lock to thereby allow rotation of the ball lock with respect to the body.

9. The bipod of claim 8, wherein the ball lock mechanism further comprises a ball retainer that extends through a central orifice in the ball lock, that is coupled to the body, and that has an opening that receives the ball, and wherein a spring biases the plunger into the first position, with a bearing end of the plunger retaining the ball in the recess of the ball lock, and wherein, when the plunger is moved into the second position, the ball moves through the opening in the ball retainer and out of the recess of the ball lock.

10. The bipod of claim 1, wherein the bipod base pivots with respect to the body in a first plane, and the firearm mounting bracket pivots with respect to the base in a second plane, and wherein the legs pivot in third and fourth planes, respectively, and wherein the first, second, third, and fourth planes are not parallel to each other.

11. A bipod for a firearm comprising:
    a body having cutout portions therein;
    a bipod base pivotally mounted to said body;
    a firearm mounting bracket dimensioned to secure a firearm and pivotally mounted to said bipod base; and
    a pair of telescoping legs each pivotally mounted to said body with a ball lock mechanism,
    wherein the telescoping legs comprise:
        an outer member and an inner member;
        said outer member comprising:
            slots formed to receive ridges;
            holes dimensioned to receive a button;
            a hollow portion dimensioned to accept the inner member and allow the inner member to telescope inward and outward;
        said inner member comprising:
            a backbone with a first end and a second end;
            ridges along said backbone dimensioned to be received in the slots of the outer member;

a tab with resisting means located on the first end of the inner member;

a button on said tab dimensioned to be received in the holes of the outer member;

a foot located on the second end of the inner member; and a stop pin located near the foot.

12. The bipod of claim 11, wherein the foot has a non-skid bottom surface.

13. The bipod of claim 11, wherein the outer and inner legs are dimensioned such that when the inner legs are in a fully retracted position, the outer legs are fully stowed against the firearm.

14. The bipod of claim 11, wherein the holes and buttons are oval in shape.

15. The bipod of claim 11, wherein the top of the button is curved and has a sloping end that engages the edge of the holes to flex the tab inward while the inner member is pulled out of the outer member.

16. The bipod of claim 15, wherein the other end of the button is a non-sloping, essentially vertical end that catches the holes when the inner member is pushed into the outer member.

17. A bipod for a firearm comprising:
a body having cutout portions therein;
a bipod base pivotally mounted to said body;
a firearm mounting bracket dimensioned to secure a firearm and pivotally mounted to said bipod base; and
a pair of legs each pivotally mounted to said body with a ball lock mechanism,
wherein each ball lock mechanism comprises:
 a plunger with a bearing end and a reduced diameter section,
 a ball bearing in contact with the bearing end or the reduced diameter section;
 a ball bearing retainer comprising an orifice for the ball bearing, and an orifice for a connecting pin;
 a spring inside the ball bearing retainer and pushing against the bearing end of the plunger; and,
 a ball lock with an orifice to accept the ball bearing retainer and notches within the orifice to accept the ball bearing.

18. The bipod of claim 17, wherein the ball lock mechanism further comprises limiting pins attached to the body to prevent over-rotation.

19. A bipod for a firearm comprising:
a body having cutout portions therein;
a bipod base pivotally mounted to said body;
a firearm mounting bracket dimensioned to secure a firearm and pivotally mounted to said bipod base, the firearm mounting bracket comprising a firearm rail clamp that is dimensioned to receive a firearm rail and that is pivotally mounted to the bipod base; and
a pair of legs each pivotally mounted to said body with a ball lock mechanism,
wherein the firearm rail clamp comprises:
 a rail clamp body dimensioned to receive a rail clamp bar and a firearm rail;
 a rail clamp bar secured to the rail clamp body with rail clamp bar fasteners; and,
 bores in the rail clamp bar and the rail clamp body receiving rail clamp bar fasteners.

20. The bipod of claim 19, wherein the bores are threaded, and the fasteners are screws.

21. The bipod of claim 19, wherein the rail clamp further comprises:
two rounded journals on the bottom surface of the rail clamp body;
a hole through each journal dimensioned to accept a rail clamp pivot pin; and,
a rail clamp pivot pin pivotally mounting the rail clamp to the bipod base, thereby allowing a canting motion.

22. A bipod for a firearm, comprising:
a body;
a base pivotally mounted to the body to pivot with respect to the body in a first plane;
a firearm mounting bracket having a groove sized to secure a firearm rail, wherein the firearm mounting bracket is pivotally mounted to the base to pivot with respect to the base in a second plane that is perpendicular to the first plane; and
a pair of legs each pivotally mounted to the body with a ball lock mechanism to pivot with respect to the body, the two ball lock mechanisms being separate from each other so that the legs are independently pivotable.

23. The bipod of claim 22, wherein each ball lock mechanism comprises a ball lock attached to the leg and having an orifice and a recess, a plunger having a recess and extending into the orifice of the ball lock, and a ball movable between the recess of the ball lock and the recess of the plunger, wherein the plunger is movable between a first position in which the plunger retains the ball in the recess of the ball lock to prevent rotation of the ball lock with respect to the body and a second position in which the plunger receives the ball in the recess of the plunger to allow rotation of the ball lock with respect to the body.

24. The bipod of claim 22, wherein the legs pivot in third and fourth planes, respectively, that are not parallel to each other.

25. A bipod for a firearm, comprising:
a body;
a base mounted to the body;
a mounting bracket mounted to the base, the mounting bracket having a groove that is sized to receive a firearm rail;
first and second legs each mounted to the body;
means for canting the mounting bracket with respect to the body;
means for traversing the mounting bracket with respect to the body; and
first and second means for pivoting the first and second legs, respectively, between a stored position and a deployed position, the first and second means for pivoting the legs being separate from each other and independently operable.

* * * * *